(12) United States Patent
Yang et al.

(10) Patent No.: US 10,455,623 B2
(45) Date of Patent: Oct. 22, 2019

(54) BACKOFF WINDOW ADJUSTMENT METHOD, AND APPARATUS

(71) Applicant: Huawei Technologies Co., Ltd., Shenzhen (CN)

(72) Inventors: Meiying Yang, Beijing (CN); Zuomin Wu, Beijing (CN); Sha Ma, Beijing (CN); Qiang Li, Shenzhen (CN); Lei Wan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 68 days.

(21) Appl. No.: 15/706,314

(22) Filed: Sep. 15, 2017

(65) Prior Publication Data
US 2018/0020485 A1    Jan. 18, 2018

Related U.S. Application Data

(63) Continuation of application No. PCT/CN2015/074317, filed on Mar. 16, 2015.

(51) Int. Cl.
*H04W 74/08* (2009.01)
*H04L 12/801* (2013.01)

(52) U.S. Cl.
CPC ....... *H04W 74/0833* (2013.01); *H04W 74/08* (2013.01); *H04W 74/0816* (2013.01); *H04L 47/14* (2013.01)

(58) Field of Classification Search
CPC .. H04L 47/14; H04W 74/08; H04W 74/0833; H04W 74/0816
See application file for complete search history.

(56) References Cited

U.S. PATENT DOCUMENTS

| 8,155,102 | B1 | 4/2012 | Hakola et al. |
| 2008/0002734 | A1 | 1/2008 | Zheng et al. |
| 2014/0126477 | A1 | 5/2014 | Choi et al. |

(Continued)

FOREIGN PATENT DOCUMENTS

| CN | 101267377 A | 9/2008 |
| CN | 103298027 A | 9/2013 |

(Continued)

OTHER PUBLICATIONS

IQ.IP.com, Patent; May 31, 2019 (Year: 2019).*

(Continued)

*Primary Examiner* — Benjamin H Elliott, IV
(74) *Attorney, Agent, or Firm* — Leydig, Voit & Mayer, Ltd.

(57) ABSTRACT

Embodiments of the present disclosure provide a backoff window adjustment method, and an apparatus. In downlink transmission, a base station obtains a trigger condition for adjusting a length of a backoff window on a first channel, and adjusts the length of the backoff window of the base station on the first channel according to the obtained trigger condition for adjusting the length of the backoff window on the first channel. In uplink transmission, a user equipment (UE) obtains a trigger condition for adjusting a length of a backoff window on a first channel, and adjusts the length of the backoff window of the UE on the first channel according to the obtained trigger condition for adjusting the length of the backoff window on the first channel.

11 Claims, 8 Drawing Sheets

(56) References Cited

U.S. PATENT DOCUMENTS

| | | | |
|---|---|---|---|
| 2015/0009814 A1 | 1/2015 | Wu et al. | |
| 2016/0165624 A1* | 6/2016 | Benveniste | H04L 47/10 370/230 |
| 2016/0212767 A1* | 7/2016 | Yin | H04W 24/08 |
| 2017/0019909 A1* | 1/2017 | Si | H04L 47/27 |
| 2018/0020485 A1* | 1/2018 | Yang | H04W 74/08 |

FOREIGN PATENT DOCUMENTS

| | | |
|---|---|---|
| CN | 103561477 A | 2/2014 |
| EP | 2154926 A1 | 2/2010 |
| EP | 2814285 A1 | 12/2014 |
| EP | 3018974 A1 | 5/2016 |
| WO | 2015002123 A1 | 1/2015 |

OTHER PUBLICATIONS

IQ.IP.com, NPL; May 31, 2019 (Year: 2019).*

"3rd Generation Partnership Project; Technical Specification Group Radio Access Network; Evolved Universal Terrestrial Radio Access (E-UTRA); Physical layer procedures (Release 12)," 3GPP TS 36.213 V12.4.0, 3rd Generation Partnership Project, Valbonne, France (Dec. 2014).

"3rd Generation Partnership Project; Technical Specification Group Radio Access Network; Study on Licensed-Assisted Access to Unlicensed Spectrum; (Release 13)," 3GPP TR 36.889 V03.1, 3rd Generation Partnership Project, Valbonne, France (Feb. 2015).

* cited by examiner

BACKOFF WINDOW ADJUSTMENT METHOD, AND APPARATUS

CROSS-REFERENCE TO RELATED APPLICATIONS

This application is a continuation of International Application No. PCT/CN2015/074317, filed on Mar. 16, 2015, the disclosure of which is hereby incorporated by reference in its entirety.

TECHNICAL FIELD

Embodiments of the present disclosure relate to communications technologies, and in particular, to a backoff window adjustment method, and an apparatus.

BACKGROUND

In an existing wireless communications field, a spectrum resource mainly falls into two types: a licensed spectrum resource and an unlicensed spectrum resource. The licensed spectrum resource is a spectrum resource delimited by a radio regulatory commission of the government for special use, for example, a spectrum resource that is used by a mobile operator or is dedicated for civil aviation, a railway, and police. Due to exclusiveness in terms of policy, quality of service of the licensed spectrum resource may be generally guaranteed, and it is also easier to perform scheduling control on the licensed spectrum resource.

The unlicensed spectrum resource is also a spectrum resource delimited by a related government department. No limitation is imposed on a radio technology, an operation enterprise, or a service life, and quality of service of this frequency band is not guaranteed either. An unlicensed spectrum resource can be free for use, provided that a communications device that uses the unlicensed spectrum resource meets a requirement on a transmit power indicator, an out-of-band leakage indicator, or another indicator. A common communications system in which the unlicensed spectrum resource is used for communication includes a civil walkie-talkie, a radio remote controller, a Wireless Fidelity (Wi-Fi) communications system, a Bluetooth communications system, or the like.

In an existing Long Term Evolution (LTE) system, a spectrum resource used by an operator is mainly a licensed spectrum resource. With a growing quantity of users in a mobile communications network and a higher user requirement on a communication speed and quality of service, it is difficult to meet the operator's demand for an existing service by using the existing licensed spectrum resource. Considering that a new licensed spectrum is expensive and is scarce, the operator starts to pay attention to an unlicensed spectrum resource, to hope that the unlicensed spectrum resource can be used to implement network capacity offloading and quality of service improvement. A licensed-assisted access using Long Term Evolution (LAA-LTE) system or a Long Term Evolution in unlicensed spectrum (U-LTE) system is used to study an issue that the unlicensed spectrum resource is applied to the LTE system for communication.

To ensure friendly coexistence of a system and a device that communicate in an unlicensed spectrum, a listen-before-talk (LBT) channel access mechanism is introduced in some countries and regions, for example, Europe and Japan. A basic concept of LBT is as follows: Before sending a signal on a channel, each communications device needs to first detect whether the current channel is idle, that is, whether it can be detected that a neighboring node is occupying the channel for sending a signal. This detection process is referred to as clear channel assessment (CCA). If it is detected, within a time period, that the channel is idle, the communications device may send the signal. If it is detected that the channel is occupied, the communications device cannot send a signal currently. Specifically, as specified by European regulations, the LBT mechanism is further classified into a frame based equipment (FBE) LBT mechanism and a load based equipment (LBE) LBT mechanism. A channel access manner in a Wi-Fi system is one type of LBE, and is specifically a carrier sense multiple access with collision avoidance CSMA/CA for short) mechanism. In the LBE access mechanism specified by the regulations, when system detection indicates collision, a contention window is a fixed value. However, in the LBE channel access mechanism of the Wi-Fi, when system detection indicates collision, a contention window exponentially increases. If the LAA system meets only a requirement made by the regulations, when the LAA system and the Wi-Fi system contend for a channel, once resource collision occurs, there is a higher probability that a channel may be preempted in the LAA. Consequently, a probability that the channel is accessed in the Wi-Fi system is reduced, and fair coexistence with the Wi-Fi cannot be ensured.

SUMMARY

Embodiments of the present disclosure provide a backoff window adjustment method, and an apparatus, so that when resource collision occurs, an LAA system can flexibly adjust its backoff window and fairly use a wireless resource with a WIFI system.

A first aspect of the present disclosure provides a backoff window adjustment method, including:
obtaining, by a base station, first information that is used to instruct to adjust a backoff window on a first channel; and
adjusting, by the base station, the backoff window according to the first information, where
the obtaining, by a base station, the first information includes at least one of the following steps:
obtaining, by the base station, the first information according to second information sent by at least one user equipment UE;
obtaining, by the base station, the first information according to a result of clear channel assessment CCA on the first channel;
obtaining, by the base station, the first information according to a result of system collision detection on the first channel; or
obtaining, by the base station, the first information according to whether a length of the backoff window on the first channel reaches a maximum length.

With reference to the first aspect of the present disclosure, in a first possible implementation manner of the first aspect of the present disclosure, the second information is response information, and the method further includes:
receiving, by the base station, at least one piece of response information sent by the at least one UE, where the at least one piece of response information is response information that is sent by the at least one UE and that is corresponding to at least one data packet transmitted on the first channel, and each of the at least one piece of response information is positive acknowledgment ACK information or negative acknowledgment NACK information;

the obtaining, by the base station, the first information according to second information sent by at least one UE includes:

obtaining, by the base station, the first information according to the at least one piece of response information sent by the at least one UE; and the adjusting, by the base station, the backoff window according to the first information includes at least one of the following steps:

if the first information is equivalent NACK information, increasing, by the base station, the backoff window of the base station on the first channel; or if the first information is equivalent ACK information, decreasing, by the base station, the backoff window of the base station on the first channel, or keeping, by the base station, the backoff window of the base station on the first channel unchanged.

With reference to the first possible implementation manner of the first aspect of the present disclosure, in a second possible implementation manner of the first aspect of the present disclosure, the obtaining, by the base station, the first information according to the at least one piece of response information sent by the at least one UE includes at least one of the following steps:

obtaining, by the base station, a first value according to a ratio of a quantity of pieces of ACK information in the at least one piece of response information, to a total quantity of pieces of the at least one piece of response information, where if the first value is greater than a preset first threshold, the first information is the equivalent ACK information;

obtaining, by the base station, a second value according to a ratio of a quantity of pieces of NACK information in the at least one piece of response information, to a total quantity of pieces of the at least one piece of response information, where if the second value is greater than a preset second threshold, the first information is the equivalent NACK information;

obtaining, by the base station, a third value according to a quantity of pieces of ACK information in the at least one piece of response information, where if the third value is greater than a preset third threshold, the first information is the equivalent ACK information; or obtaining, by the base station, a fourth value according to a quantity of pieces of NACK information in the at least one piece of response information, where if the fourth value is greater than a preset fourth threshold, the first information is the equivalent NACK information.

With reference to the first aspect of the present disclosure, in a third possible implementation manner of the first aspect of the present disclosure, the second information is response information, and the method further includes:

receiving, by the base station, at least one piece of response information sent by the at least one UE, where the at least one piece of response information is response information that is sent by the at least one UE and that is corresponding to at least one data packet transmitted on the first channel, and each of the at least one piece of response information is positive acknowledgment ACK information or negative acknowledgment NACK information;

the obtaining, by the base station, the first information according to second information sent by at least one UE includes:

obtaining, by the base station, first information of first UE of the at least one UE according to at least one piece of response information sent by the first UE, where the first UE is any UE of the at least one UE; and the adjusting, by the base station, the backoff window according to the first information includes at least one of the following steps:

if the first information of the first UE is equivalent NACK information, increasing, by the base station, a backoff window that is of the base station on the first channel and that is used to schedule the first UE, or keeping, by the base station, a backoff window that is of the base station on the first channel and that is used to schedule the first UE, unchanged, and skipping, by the base station, scheduling the first UE within first time; or if the first information of the first UE is equivalent ACK information, decreasing, by the base station, a backoff window that is of the base station on the first channel and that is used to schedule the first UE, or keeping, by the base station, a backoff window that is of the base station on the first channel and that is used to schedule the first UE, unchanged.

With reference to the third possible implementation manner of the first aspect of the present disclosure, in a fourth possible implementation manner of the first aspect of the present disclosure, the obtaining, by the base station, first information of first UE of the at least one UE according to at least one piece of response information sent by the first UE includes at least one of the following steps:

obtaining, by the base station, a fifth value according to a ratio of a quantity of pieces of ACK information in the at least one piece of response information sent by the first UE, to a total quantity of pieces of the at least one piece of response information sent by the first UE, where if the fifth value is greater than a preset fifth threshold, the first information of the first UE is the equivalent ACK information;

obtaining, by the base station, a sixth value according to a ratio of a quantity of pieces of NACK information in the at least one piece of response information sent by the first UE, to a total quantity of pieces of the at least one piece of response information sent by the first UE, where if the sixth value is greater than a preset sixth threshold, the first information of the first UE is the equivalent NACK information;

obtaining, by the base station, a seventh value according to a quantity of pieces of ACK information in the at least one piece of response information sent by the first UE, where if the seventh value is greater than a preset seventh threshold, the first information of the first UE is the equivalent ACK information; or obtaining, by the base station, an eighth value according to a quantity of pieces of NACK information in the at least one piece of response information sent by the first UE, where if the eighth value is greater than a preset eighth threshold, the first information of the first UE is the equivalent NACK information.

With reference to the first aspect of the present disclosure, in a fifth possible implementation manner of the first aspect of the present disclosure, the second information is response information and precoding matrix indicator PMI information, and the method further includes:

receiving, by the base station, at least one piece of response information and at least one piece of PMI information that are sent by the at least one UE, where the at least one piece of response information is response information that is sent by the at least one UE and that is corresponding to at least one data packet transmitted on the first channel, each of the at least one piece of response information is positive acknowledgment ACK information or negative acknowledgment NACK information, and the at least one piece of PMI information is used to indicate at least one PMI indication direction;

the obtaining, by the base station, the first information according to second information sent by at least one UE includes:

obtaining, by the base station, first information in a first PMI indication direction according to at least one piece of response information in the first PMI indication direction of the at least one PMI direction indicated by the at least one piece of PMI information, where the first PMI indication direction is any PMI indication direction of the at least one PMI indication direction; and the adjusting, by the base station, the backoff window according to the first information includes at least one of the following steps:

if the first information in the first PMI indication direction is equivalent NACK information, increasing, by the base station, a backoff window that is of the base station on the first channel and that is used to schedule UE in the first PMI indication direction, or keeping, by the base station, a backoff window that is of the base station on the first channel and that is used to schedule UE in the first PMI indication direction, unchanged, and skipping, by the base station, scheduling the UE in the first PMI indication direction within second time; or if the first information in the first PMI indication direction is equivalent ACK information, decreasing, by the base station, a backoff window that is of the base station on the first channel and that is used to schedule UE in the first PMI indication direction, or keeping, by the base station, a backoff window that is of the base station on the first channel and that is used to schedule UE in the first PMI indication direction, unchanged.

With reference to the fifth possible implementation manner of the first aspect of the present disclosure, in a sixth possible implementation manner of the first aspect of the present disclosure, the obtaining, by the base station, first information in a first PMI indication direction according to at least one piece of response information in the first PMI indication direction of the at least one PMI direction indicated by the at least one piece of PMI information includes at least one of the following steps:

obtaining, by the base station, a ninth value according to a ratio of a quantity of pieces of ACK information in the at least one piece of response information in the first PMI indication direction, to a total quantity of pieces of the at least one piece of response information in the first PMI indication direction, where if the ninth value is greater than a preset ninth threshold, the first information in the first PMI indication direction is the equivalent ACK information;

obtaining, by the base station, a tenth value according to a ratio of a quantity of pieces of NACK information in the at least one piece of response information in the first PMI indication direction, to a total quantity of pieces of the at least one piece of response information in the first PMI indication direction, where if the tenth value is greater than a preset tenth threshold, the first information in the first PMI indication direction is the equivalent NACK information;

obtaining, by the base station, an eleventh value according to a quantity of pieces of ACK information in the at least one piece of response information in the first PMI indication direction, where if the eleventh value is greater than a preset eleventh threshold, the first information in the first PMI indication direction is the equivalent ACK information; or obtaining, by the base station, a twelfth value according to a quantity of pieces of NACK information in the at least one piece of response information in the first PMI indication direction, where if the twelfth value is greater than a preset twelfth threshold, the first information in the first PMI indication direction is the equivalent NACK information.

With reference to the first aspect of the present disclosure, in a seventh possible implementation manner of the first aspect of the present disclosure, the second information is collision information, and the method further includes:

receiving, by the base station, at least one piece of collision information sent by the at least one UE, where the collision information is used to indicate whether the base station collides with a WI-FI system, an LAA system, or another system on the first channel;

the obtaining, by the base station, the first information according to second information sent by at least one UE includes:

obtaining, by the base station, the first information according to the at least one piece of collision information sent by the at least one UE; and the adjusting, by the base station, the backoff window according to the first information includes at least one of the following steps:

if the first information is equivalent collision, increasing, by the base station, the backoff window of the base station on the first channel; or if the first information is equivalent non-collision, decreasing, by the base station, the backoff window of the base station on the first channel, or keeping, by the base station, the backoff window of the base station on the first channel unchanged.

With reference to the seventh possible implementation manner of the first aspect of the present disclosure, in an eighth possible implementation manner of the first aspect of the present disclosure, the obtaining, by the base station, the first information according to the at least one piece of collision information sent by the at least one UE includes at least one of the following steps:

obtaining, by the base station, a thirteenth value according to a ratio of a quantity of pieces of information that is in the at least one piece of collision information and indicates no collision, to a total quantity of pieces of the at least one piece of collision information, where if the thirteenth value is greater than a preset thirteenth threshold, the first information is the equivalent non-collision;

obtaining, by the base station, a fourteenth value according to a ratio of a quantity of pieces of information that is in the at least one piece of collision information and indicates collision, to a total quantity of pieces of the at least one piece of collision information, where if the fourteenth value is greater than a preset fourteenth threshold, the first information is the equivalent collision;

obtaining, by the base station, a fifteenth value according to a quantity of pieces of information that is in the at least one piece of collision information and indicates no collision, where if the fifteenth value is greater than a preset fifteenth threshold, the first information is the equivalent non-collision; or obtaining, by the base station, a sixteenth value according to a quantity of pieces of information that is in the at least one piece of collision information and indicates collision, where if the sixteenth value is greater than a preset sixteenth threshold, the first information is the equivalent collision.

With reference to the first aspect of the present disclosure, in a ninth possible implementation manner of the first aspect of the present disclosure, the second information is response information, and the method further includes:

receiving, by the base station, at least one piece of response information sent by the at least one UE, where the at least one piece of response information is response information that is sent by the at least one UE and that is corresponding to at least one data packet transmitted on the first channel, and each of the at least one piece of response information is positive acknowledgment ACK information or negative acknowledgment NACK information;

the obtaining, by the base station, the first information according to second information sent by at least one UE includes:

obtaining, by the base station, information about a quantity of retransmission times of an automatic repeat request ARQ and/or a hybrid automatic repeat request HARQ of a first UE of the at least one UE according to response information sent by the first UE, where the quantity of retransmission times of the ARQ and/or the HARQ of the first UE is the first information; and the adjusting, by the base station, the backoff window according to the first information includes at least one of the following steps:

if the quantity of retransmission times of the ARQ and/or the HARQ of the first UE is greater than a preset seventeenth threshold, increasing, by the base station, the backoff window of the base station on the first channel; or if the quantity of retransmission times of the ARQ and/or the HARQ of the first UE is less than a preset eighteenth threshold, decreasing, by the base station, the backoff window of the base station on the first channel, or keeping, by the base station, the backoff window of the base station on the first channel unchanged.

With reference to the first aspect of the present disclosure, in a tenth possible implementation manner of the first aspect of the present disclosure, the obtaining, by the base station, the first information according to a result of clear channel assessment CCA on the first channel includes:

performing, by the base station, CCA check on the first channel, to obtain information about idle time of the first channel and total CCA check time of the first channel; and obtaining, by the base station, a seventeenth value according to a ratio of the idle time of the first channel to the total CCA check time of the first channel, where the seventeenth value is the first information; and the adjusting, by the base station, the backoff window according to the first information includes at least one of the following steps:

if the seventeenth value is less than a preset nineteenth threshold, increasing, by the base station, the backoff window of the base station on the first channel; or if the seventeenth value is greater than a preset twentieth threshold, decreasing, by the base station, the backoff window of the base station on the first channel, or keeping, by the base station, the backoff window of the base station on the first channel unchanged.

With reference to the first aspect of the present disclosure, in an eleventh possible implementation manner of the first aspect of the present disclosure, the obtaining, by the base station, the first information according to a result of clear channel assessment CCA on the first channel includes:

performing, by the base station, CCA check on the first channel on a basis of a CCA slot, to obtain information about a quantity of idle CCA slots on the first channel, where the CCA slot is of a predefined time length, and the information about the quantity of idle CCA slots on the first channel is the first information; and the adjusting, by the base station, the backoff window according to the first information includes at least one of the following steps:

if the base station does not detect N idle CCA slots within a time length of M CCA slots on the first channel, increasing, by the base station, the backoff window of the base station on the first channel; or if the base station detects at least N idle CCA slots within a time length of M CCA slots on the first channel, decreasing, by the base station, the backoff window of the base station on the first channel, or keeping, by the base station, the backoff window of the base station on the first channel unchanged, where the time length of the M CCA slots is a length of the backoff window of the base station on the first channel at a current moment, and N is a random number, between 0 and M, randomly generated by the base station before performing CCA check.

With reference to the first aspect of the present disclosure, in a twelfth possible implementation manner of the first aspect of the present disclosure, the obtaining, by the base station, the first information according to a result of system collision detection on the first channel includes:

detecting, by the base station, a signal of a WI-FI system, an LAA system, or another system on the first channel, to obtain information about whether the base station collides with the WI-FI system, the LAA system, or the another system on the first channel, where the information about whether the base station collides with the WI-FI system, the LAA system, or the another system on the first channel is the first information; and the adjusting, by the base station, the backoff window according to the first information includes at least one of the following steps:

if the first information indicates system collision, increasing, by the base station, the backoff window of the base station on the first channel; or if the first information indicates no system collision, decreasing, by the base station, the backoff window of the base station on the first channel, or keeping, by the base station, the backoff window of the base station on the first channel unchanged.

With reference to the first aspect of the present disclosure, in a thirteenth possible implementation manner of the first aspect of the present disclosure, the obtaining, by the base station, the first information according to whether a length of the backoff window on the first channel reaches a maximum length includes:

determining, by the base station, that the length of the backoff window of the base station on the first channel reaches the maximum length; and the adjusting, by the base station, the backoff window according to the first information includes:

if the length of the backoff window of the base station on the first channel reaches the maximum length and this case maintains P times, decreasing, by the base station, the backoff window of the base station on the first channel, where P is an integer that is not less than 0.

A second aspect of the present disclosure provides a backoff window adjustment method, including:

obtaining, by user equipment UE, first information that is used to instruct to adjust a backoff window on a first channel; and adjusting, by the UE, the backoff window of the UE on the first channel according to the first information, where the obtaining, by UE, the first information includes at least one of the following steps:

obtaining, by the UE, the first information according to second information sent by a base station;

obtaining, by the UE, the first information according to a result of clear channel assessment CCA on the first channel;

obtaining, by the UE, the first information according to a result of system collision detection on the first channel; or obtaining, by the UE, the first information according to whether a length of the backoff window on the first channel reaches a maximum length.

With reference to the second aspect of the present disclosure, in a first possible implementation manner of the second aspect of the present disclosure, the second information is response information, and the method further includes:

receiving, by the UE, at least one piece of response information sent by the base station, where the at least one piece of response information is response information that is of the base station and that is corresponding to at least one data packet transmitted on the first channel, and each of the at least one piece of response information is positive acknowledgment ACK information or negative acknowledgment NACK information;

the obtaining, by the UE, the first information according to second information sent by the base station includes:

obtaining, by the UE, the first information according to the at least one piece of response information; and the adjusting, by the UE, the backoff window of the UE on the first channel according to the first information includes at least one of the following steps:

if the first information includes at least one piece of NACK information, increasing, by the UE, the backoff window of the UE on the first channel; or if the first information includes at least one piece of ACK information, decreasing, by the UE, the backoff window of the UE on the first channel, or keeping, by the UE, the backoff window of the UE on the first channel unchanged.

With reference to the second aspect of the present disclosure, in a second possible implementation manner of the second aspect of the present disclosure, the obtaining, by the UE, the first information according to a result of clear channel assessment CCA on the first channel includes:

performing, by the UE, CCA check on the first channel, to obtain information about idle time of the first channel and total CCA check time of the first channel; and obtaining, by the UE, an eighteenth value according to a ratio of the idle time of the first channel to the total CCA check time of the first channel, where the eighteenth value is the first information; and the adjusting, by the UE, the backoff window of the UE on the first channel according to the first information includes at least one of the following steps:

if the eighteenth value is less than a preset twenty-first threshold, increasing, by the UE, the backoff window of the UE on the first channel; or if the eighteenth value is greater than a preset twenty-second threshold, decreasing, by the UE, the backoff window of the UE on the first channel, or keeping, by the UE, the backoff window of the UE on the first channel unchanged.

With reference to the second aspect of the present disclosure, in a third possible implementation manner of the second aspect of the present disclosure, the obtaining, by the UE, the first information according to a result of clear channel assessment CCA on the first channel includes:

performing, by the UE, CCA check on the first channel on a basis of a CCA slot, to obtain information about a quantity of idle CCA slots on the first channel, where the CCA slot is of a predefined time length, and the information about the quantity of idle CCA slots on the first channel is the first information; and the adjusting, by the UE, the backoff window of the UE on the first channel according to the first information includes at least one of the following steps:

if the UE does not detect N idle CCA slots within a time length of M CCA slots on the first channel, increasing, by the UE, the backoff window of the UE on the first channel; or if the UE detects N idle CCA slots within a time length of M CCA slots on the first channel, decreasing, by the UE, the backoff window of the UE on the first channel, or keeping, by the UE, the backoff window of the UE on the first channel unchanged, where the time length of the M CCA slots is a current length of the backoff window of the UE on the first channel, and N is a random number, between 0 and M, randomly generated by the UE before performing CCA check.

With reference to the second aspect of the present disclosure, in a fourth possible implementation manner of the second aspect of the present disclosure, the obtaining, by the UE, the first information according to a result of system collision detection on the first channel includes:

detecting, by the UE, a signal of a WI-FI system, an LAA system, or another system on the first channel, to obtain information about whether the UE collides with the WI-FI system, the LAA system, or the another system on the first channel, where the information about whether the UE collides with the WI-FI system, the LAA system, or the another system on the first channel is the first information; and the adjusting, by the UE, the backoff window of the UE on the first channel according to the first information includes at least one of the following steps:

if the first information indicates system collision, increasing, by the UE, the backoff window of the UE on the first channel; or if the first information indicates no system collision, decreasing, by the UE, the backoff window of the UE on the first channel, or keeping, by the UE, the backoff window of the UE on the first channel unchanged.

With reference to the second aspect of the present disclosure, in a fifth possible implementation manner of the second aspect of the present disclosure, the obtaining, by the UE, the first information according to whether a length of the backoff window on the first channel reaches a maximum length includes:

determining, by the UE, that the length of the backoff window of the UE on the first channel reaches the maximum length; and the adjusting, by the UE, the backoff window of the UE on the first channel according to the first information includes:

if the length of the backoff window of the UE on the first channel reaches the maximum length and this case maintains P times, decreasing, by the UE, the backoff window of the UE on the first channel, where P is an integer that is not less than 0.

A third aspect of the present disclosure provides a base station, including:

an obtaining module, configured to obtain first information that is used to instruct to adjust a backoff window on a first channel; and an adjustment module, configured to adjust the backoff window according to the first information, where the obtaining, by an obtaining module, first information includes at least one of the following steps:

obtaining the first information according to second information sent by at least one user equipment UE;

obtaining the first information according to a result of clear channel assessment CCA on the first channel;

obtaining the first information according to a result of system collision detection on the first channel; or obtaining the first information according to whether a length of the backoff window on the first channel reaches a maximum length.

With reference to the third aspect of the present disclosure, in a first possible implementation manner of the third aspect of the present disclosure, the second information is response information, and the base station further includes:

a receiving module, configured to receive at least one piece of response information sent by the at least one UE, where the at least one piece of response information is response information that is sent by the at least one UE and that is corresponding to at least one data packet transmitted on the first channel, and each of the at least one piece of response information is positive acknowledgment ACK information or negative acknowledgment NACK information;

the obtaining, by the obtaining module, the first information according to second information sent by at least one user equipment UE includes:

obtaining the first information according to the at least one piece of response information sent by the at least one UE; and the adjusting, by the adjustment module, the backoff window according to the first information includes at least one of the following steps:

if the first information is equivalent NACK information, increasing the backoff window of the base station on the first channel; or if the first information is equivalent ACK information, decreasing the backoff window of the base station on the first channel, or keeping the backoff window of the base station on the first channel unchanged.

With reference to the first possible implementation manner of the third aspect of the present disclosure, in a second possible implementation manner of the third aspect of the present disclosure, the obtaining, by the obtaining module, the first information according to the at least one piece of response information sent by the at least one UE includes at least one of the following steps:

obtaining a first value according to a ratio of a quantity of pieces of ACK information in the at least one piece of response information, to a total quantity of pieces of the at least one piece of response information, where if the first value is greater than a preset first threshold, the first information is the equivalent ACK information;

obtaining a second value according to a ratio of a quantity of pieces of NACK information in the at least one piece of response information, to a total quantity of pieces of the at least one piece of response information, where if the second value is greater than a preset second threshold, the first information is the equivalent NACK information;

obtaining a third value according to a quantity of pieces of ACK information in the at least one piece of response information, where if the third value is greater than a preset third threshold, the first information is the equivalent ACK information; or obtaining a fourth value according to a quantity of pieces of NACK information in the at least one piece of response information, where if the fourth value is greater than a preset fourth threshold, the first information is the equivalent NACK information.

With reference to the third aspect of the present disclosure, in a third possible implementation manner of the third aspect of the present disclosure, the second information is response information, and the base station further includes:

a receiving module, configured to receive at least one piece of response information sent by the at least one UE, where the at least one piece of response information is response information that is sent by the at least one UE and that is corresponding to at least one data packet transmitted on the first channel, and each of the at least one piece of response information is positive acknowledgment ACK information or negative acknowledgment NACK information;

the obtaining, by the obtaining module, the first information according to second information sent by at least one user equipment UE includes: obtaining first information of first UE of the at least one UE according to at least one piece of response information sent by the first UE, where the first UE is any UE of the at least one UE; and the adjusting, by the adjustment module, the backoff window according to the first information includes at least one of the following steps:

if the first information of the first UE is equivalent NACK information, increasing a backoff window that is of the base station on the first channel and that is used to schedule the first UE, or keeping a backoff window that is of the base station on the first channel and that is used to schedule the first UE, unchanged, and skipping scheduling the first UE within first time; or if the first information of the first UE is equivalent ACK information, decreasing a backoff window that is of the base station on the first channel and that is used to schedule the first UE, or keeping a backoff window that is of the base station on the first channel and that is used to schedule the first UE, unchanged.

With reference to the third possible implementation manner of the third aspect of the present disclosure, in a fourth possible implementation manner of the third aspect of the present disclosure, the obtaining, by the obtaining module, first information of first UE of the at least one UE according to at least one piece of response information sent by the first UE includes at least one of the following steps:

obtaining a fifth value according to a ratio of a quantity of pieces of ACK information in the at least one piece of response information sent by the first UE, to a total quantity of pieces of the at least one piece of response information sent by the first UE, where if the fifth value is greater than a preset fifth threshold, the first information of the first UE is the equivalent ACK information;

obtaining a sixth value according to a ratio of a quantity of pieces of NACK information in the at least one piece of response information sent by the first UE, to a total quantity of pieces of the at least one piece of response information sent by the first UE, where if the sixth value is greater than a preset sixth threshold, the first information of the first UE is the equivalent NACK information;

obtaining a seventh value according to a quantity of pieces of ACK information in the at least one piece of response information sent by the first UE, where if the seventh value is greater than a preset seventh threshold, the first information of the first UE is the equivalent ACK information; or obtaining an eighth value according to a quantity of pieces of NACK information in the at least one piece of response information sent by the first UE, where if the eighth value is greater than a preset eighth threshold, the first information of the first UE is the equivalent NACK information.

With reference to the third aspect of the present disclosure, in a fifth possible implementation manner of the third aspect of the present disclosure, the second information is response information and precoding matrix indicator PMI information, and the base station further includes:

a receiving module, configured to receive at least one piece of response information and at least one piece of PMI information that are sent by the at least one UE, where the at least one piece of response information is response information that is sent by the at least one UE and that is corresponding to at least one data packet transmitted on the first channel, each of the at least one piece of response information is positive acknowledgment ACK information or negative acknowledgment NACK information, and the at least one piece of PMI information is used to indicate at least one PMI indication direction;

that the obtaining, by the obtaining module, the first information according to second information sent by at least one user equipment UE includes: obtaining first information in a first PMI indication direction according to at least one piece of response information in the first PMI indication direction of the at least one PMI direction indicated by the at least one piece of PMI information, where the first PMI indication direction is any PMI indication direction of the at least one PMI indication direction; and the adjusting, by the adjustment module, the backoff window according to the first information includes at least one of the following steps:

if the first information in the first PMI indication direction is equivalent NACK information, increasing a backoff window that is of the base station on the first channel and that is used to schedule UE in the first PMI indication direction, or keeping a backoff window that is of the base station on the first channel and that is used to schedule UE in the first PMI indication direction, unchanged, and skipping scheduling the UE in the first PMI indication direction within second time; or if the first information in the first PMI indication direction is equivalent ACK information, decreasing a backoff window that is of the base station on the first channel and that is used to schedule UE in the first PMI indication direction, or keeping a backoff window that is of the base station on the first channel and that is used to schedule UE in the first PMI indication direction, unchanged.

With reference to the fifth possible implementation manner of the third aspect of the present disclosure, in a sixth possible implementation manner of the third aspect of the present disclosure, the obtaining, by the obtaining module, first information in a first PMI indication direction according to the at least one piece of response information in the first PMI indication direction of the at least one PMI direction indicated by the at least one piece of PMI information includes at least one of the following steps:

obtaining a ninth value according to a ratio of a quantity of pieces of ACK information in the at least one piece of response information in the first PMI indication direction, to a total quantity of pieces of the at least one piece of response information in the first PMI indication direction, where if the ninth value is greater than a preset ninth threshold, the first information in the first PMI indication direction is the equivalent ACK information;

obtaining a tenth value according to a ratio of a quantity of pieces of NACK information in the at least one piece of response information in the first PMI indication direction, to a total quantity of pieces of the at least one piece of response information in the first PMI indication direction, where if the tenth value is greater than a preset tenth threshold, the first information in the first PMI indication direction is the equivalent NACK information;

obtaining an eleventh value according to a quantity of pieces of ACK information in the at least one piece of response information in the first PMI indication direction, where if the eleventh value is greater than a preset eleventh threshold, the first information in the first PMI indication direction is the equivalent ACK information; or obtaining a twelfth value according to a quantity of pieces of NACK information in the at least one piece of response information in the first PMI indication direction, where if the twelfth value is greater than a preset twelfth threshold, the first information in the first PMI indication direction is the equivalent NACK information.

With reference to the third aspect of the present disclosure, in a seventh possible implementation manner of the third aspect of the present disclosure, the second information is collision information, and the base station further includes:

a receiving module, configured to receive at least one piece of collision information sent by the at least one UE, where the collision information is used to indicate whether the base station collides with a WI-FI system, an LAA system, or another system on the first channel;

the obtaining, by the obtaining module, the first information according to second information sent by at least one user equipment UE includes: obtaining the first information according to the at least one piece of collision information sent by the at least one UE; and the adjusting, by the adjustment module, the backoff window according to the first information includes at least one of the following steps:

if the first information is equivalent collision, increasing the backoff window of the base station on the first channel; or if the first information is equivalent non-collision, decreasing the backoff window of the base station on the first channel, or keeping the backoff window of the base station on the first channel unchanged.

With reference to the seventh possible implementation manner of the third aspect of the present disclosure, in an eighth possible implementation manner of the third aspect of the present disclosure, the obtaining, by the obtaining module, the first information according to the at least one piece of collision information sent by the at least one UE includes at least one of the following steps:

obtaining a thirteenth value according to a ratio of a quantity of pieces of information that is in the at least one piece of collision information and indicates no collision, to a total quantity of pieces of the at least one piece of collision information, where if the thirteenth value is greater than a preset thirteenth threshold, the first information is the equivalent non-collision;

obtaining a fourteenth value according to a ratio of a quantity of pieces of information that is in the at least one piece of collision information and indicates collision, to a total quantity of pieces of the at least one piece of collision information, where if the fourteenth value is greater than a preset fourteenth threshold, the first information is the equivalent collision;

obtaining a fifteenth value according to a quantity of pieces of information that is in the at least one piece of collision information and indicates no collision, where if the fifteenth value is greater than a preset fifteenth threshold, the first information is the equivalent non-collision; or obtaining a sixteenth value according to a quantity of pieces of information that is in the at least one piece of collision information and indicates collision, where if the sixteenth value is greater than a preset sixteenth threshold, the first information is the equivalent collision.

With reference to the third aspect of the present disclosure, in a ninth possible implementation manner of the third aspect of the present disclosure, the second information is response information, and the base station further includes:

a receiving module, configured to receive at least one piece of response information sent by the at least one UE, where the at least one piece of response information is response information that is sent by the at least one UE and that is corresponding to at least one data packet transmitted on the first channel, and each of the at least one piece of response information is positive acknowledgment ACK information or negative acknowledgment NACK information;

the obtaining, by the obtaining module, the first information according to second information sent by at least one user equipment UE includes: obtaining information about a quantity of retransmission times of an automatic repeat request ARQ and/or a hybrid automatic repeat request HARQ of first UE of the at least one UE according to response information sent by the first UE, where the quantity of retransmission times of the ARQ and/or the HARQ of the first UE is the first information; and the adjusting, by the adjustment module, the backoff window according to the first information includes at least one of the following steps:

if the quantity of retransmission times of the ARQ and/or the HARQ of the first UE is greater than a preset seventeenth threshold, increasing the backoff window of the base station on the first channel; or if the quantity of retransmission times of the ARQ and/or the HARQ of the first UE is less than a preset eighteenth threshold, decreasing the backoff window of the base station on the first channel, or keeping the backoff window of the base station on the first channel unchanged.

With reference to the third aspect of the present disclosure, in a tenth possible implementation manner of the third aspect of the present disclosure, the obtaining, by the obtaining module, the first information according to a result of clear channel assessment CCA on the first channel includes:

performing CCA check on the first channel, to obtain information about idle time of the first channel and total CCA check time of the first channel; and obtaining a seventeenth value according to a ratio of the idle time of the first channel to the total CCA check time of the first channel, where the seventeenth value is the first information; and the adjusting, by the adjustment module, the backoff window according to the first information includes at least one of the following steps:

if the seventeenth value is less than a preset nineteenth threshold, increasing the backoff window of the base station on the first channel; or if the seventeenth value is greater than a preset twentieth threshold, decreasing the backoff window of the base station on the first channel, or keeping the backoff window of the base station on the first channel unchanged.

With reference to the third aspect of the present disclosure, in an eleventh possible implementation manner of the third aspect of the present disclosure, the obtaining, by the obtaining module, the first information according to a result of clear channel assessment CCA on the first channel includes:

performing CCA check on the first channel on a basis of a CCA slot, to obtain information about a quantity of idle CCA slots on the first channel, where the CCA slot is of a predefined time length, and the information about the quantity of idle CCA slots on the first channel is the first information; and the adjusting, by the adjustment module, the backoff window according to the first information includes at least one of the following steps:

if N idle CCA slots are not detected within a time length of M CCA slots on the first channel, increasing the backoff window of the base station on the first channel; or if at least N idle CCA slots are detected within a time length of M CCA slots on the first channel, decreasing the backoff window of the base station on the first channel, or keeping the backoff window of the base station on the first channel unchanged, where the time length of the M CCA slots is a length of the backoff window of the base station on the first channel at a current moment, and N is a random number, between 0 and M, randomly generated by the base station before performing CCA check.

With reference to the third aspect of the present disclosure, in a twelfth possible implementation manner of the third aspect of the present disclosure, the obtaining, by the obtaining module, the first information according to a result of system collision detection on the first channel includes:

detecting a signal of a WI-FI system, an LAA system, or another system on the first channel, to obtain information about whether the base station collides with the WI-FI system, the LAA system, or the another system on the first channel, where the information about whether the base station collides with the WI-FI system, the LAA system, or the another system on the first channel is the first information; and the adjusting, by the adjustment module, the backoff window according to the first information includes at least one of the following steps:

if the first information indicates system collision, increasing the backoff window of the base station on the first channel; or if the first information indicates no system collision, decreasing the backoff window of the base station on the first channel, or keeping the backoff window of the base station on the first channel unchanged.

With reference to the third aspect of the present disclosure, in a thirteenth possible implementation manner of the third aspect of the present disclosure, the obtaining, by the obtaining module, the first information according to whether a length of the backoff window on the first channel reaches a maximum length includes:

determining that the length of the backoff window of the base station on the first channel reaches the maximum length; and the adjusting, by the adjustment module, the backoff window according to the first information includes:

if the length of the backoff window of the base station on the first channel reaches the maximum length and this case maintains P times, decreasing the backoff window of the base station on the first channel, where P is an integer that is not less than 0.

A fourth aspect of the present disclosure provides UE, including:

an obtaining module, configured to obtain first information that is used to instruct to adjust a backoff window on a first channel; and an adjustment module, configured to adjust the backoff window of the UE on the first channel according to the first information, where the obtaining, by the obtaining module, first information includes at least one of the following steps:

obtaining the first information according to second information sent by a base station;

obtaining the first information according to a result of clear channel assessment CCA on the first channel;

obtaining the first information according to a result of system collision detection on the first channel; or obtaining the first information according to whether a length of the backoff window on the first channel reaches a maximum length.

With reference to the fourth aspect of the present disclosure, in a first possible implementation manner of the fourth aspect of the present disclosure, the second information is response information, and the UE further includes:

a receiving module, configured to receive at least one piece of response information sent by the base station, where the at least one piece of response information is response information that is of the base station and that is corresponding to at least one data packet transmitted on the first channel, and each of the at least one piece of response information is positive acknowledgment ACK information or negative acknowledgment NACK information;

the obtaining, by the obtaining module, the first information according to second information sent by a base station includes:

obtaining the first information according to the at least one piece of response information; and the adjusting, by the adjustment module, the backoff window of the UE on the first channel according to the first information includes at least one of the following steps:

if the first information includes at least one piece of NACK information, increasing the backoff window of the UE on the first channel; or if the first information includes at least one piece of ACK information, decreasing the backoff window of the UE on the first channel, or keeping the backoff window of the UE on the first channel unchanged.

With reference to the fourth aspect of the present disclosure, in a second possible implementation manner of the fourth aspect of the present disclosure, the obtaining, by the obtaining module, the first information according to a result of clear channel assessment CCA on the first channel includes:

performing CCA check on the first channel, to obtain information about idle time of the first channel and total CCA check time of the first channel; and obtaining an eighteenth value according to a ratio of the idle time of the first channel to the total CCA check time of the first channel, where the eighteenth value is the first information; and the adjusting, by the adjustment module, the backoff window of the UE on the first channel according to the first information includes at least one of the following steps:

if the eighteenth value is less than a preset twenty-first threshold, increasing the backoff window of the UE on the first channel; or if the eighteenth value is greater than a preset twenty-second threshold, decreasing the backoff window of the UE on the first channel, or keeping the backoff window of the UE on the first channel unchanged.

With reference to the fourth aspect of the present disclosure, in a third possible implementation manner of the fourth aspect of the present disclosure, the obtaining, by the obtaining module, the first information according to a result of clear channel assessment CCA on the first channel includes:

performing CCA check on the first channel on a basis of a CCA slot, to obtain information about a quantity of idle CCA slots on the first channel, where the CCA slot is of a predefined time length, and the information about the quantity of idle CCA slots on the first channel is the first information; and the adjusting, by the adjustment module, the backoff window of the UE on the first channel according to the first information includes at least one of the following steps:

if the UE does not detect N idle CCA slots within a time length of M CCA slots on the first channel, increasing the backoff window of the UE on the first channel; or if the UE detects N idle CCA slots within a time length of M CCA slots on the first channel, decreasing the backoff window of the UE on the first channel, or keeping the backoff window of the UE on the first channel unchanged, where the time length of the M CCA slots is a current length of the backoff window of the UE on the first channel, and N is a random number, between 0 and M, randomly generated by the UE before performing CCA check.

With reference to the fourth aspect of the present disclosure, in a fourth possible implementation manner of the fourth aspect of the present disclosure, the obtaining, by the obtaining module, the first information according to a result of system collision detection on the first channel includes:

detecting a signal of a WI-FI system, an LAA system, or another system on the first channel, to obtain information about whether the UE collides with the WI-FI system, the LAA system, or the another system on the first channel, where the information about whether the UE collides with the WI-FI system, the LAA system, or the another system on the first channel is the first information; and the adjusting, by the adjustment module, the backoff window of the UE on the first channel according to the first information includes at least one of the following steps:

if the first information indicates system collision, increasing the backoff window of the UE on the first channel; or if the first information indicates no system collision, decreasing the backoff window of the UE on the first channel, or keeping the backoff window of the UE on the first channel unchanged.

With reference to the fourth aspect of the present disclosure, in a fifth possible implementation manner of the fourth aspect of the present disclosure, the obtaining, by the obtaining module, the first information according to whether a length of the backoff window on the first channel reaches a maximum length includes:

determining that the length of the backoff window of the UE on the first channel reaches the maximum length; and the adjusting, by the adjustment module, the backoff window of the UE on the first channel according to the first information includes:

if the length of the backoff window of the UE on the first channel reaches the maximum length and this case maintains P times, decreasing the backoff window of the UE on the first channel, where P is an integer that is not less than 0.

A fifth aspect of the present disclosure provides a base station, including: a processor, a memory, a communications interface, and a system bus, where the memory, the communications interface, and the processor are connected and communicate with each other by using the system bus;

the memory is configured to store a computer execution instruction;

the communications interface is configured to communicate with another device; and the processor is configured to run the computer execution instruction, to execute the method according to any one of the first aspect of the present disclosure or the first to the thirteenth possible implementation manners of the first aspect of the present disclosure.

A sixth aspect of the present disclosure provides UE, including: a processor, a memory, a communications interface, and a system bus, where the memory, the communications interface, and the processor are connected to the processor and communicate with each other by using the system bus;

the memory is configured to store a computer execution instruction;

the communications interface is configured to communicate with another device; P and the processor is configured to run the computer execution instruction, to execute the method according to any one of the second aspect of the present disclosure or the first to the fifth possible implementation manners of the second aspect of the present disclosure.

According to the backoff window adjustment method and the apparatus that are provided in the embodiments of the present disclosure, in downlink transmission, a base station obtains first information that is used to instruct to adjust a backoff window on a first channel, and adjusts the backoff window according to the first information. In uplink transmission, UE obtains first information that is used to instruct to adjust a backoff window on a first channel, and adjusts a backoff window of the UE on the first channel according to the first information. When an LAA system and a WIFI system coexist, the LAA system and the WIFI system both adjust respective backoff windows, so that the WIFI system and LAA system can fairly contend for a channel resource after channel collision.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

Figure 1:
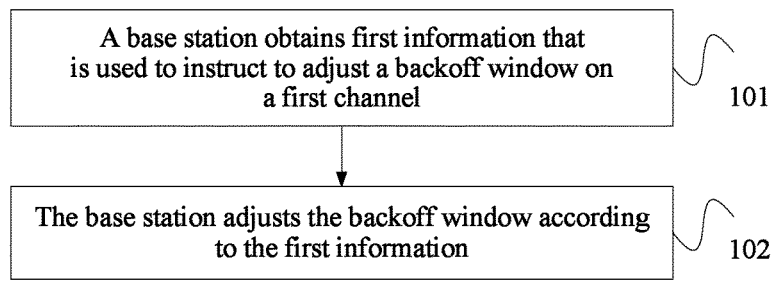
FIG. 1 is a flowchart of a backoff window adjustment method according to a first embodiment of the present disclosure.

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

In an LTE system, an LAA-LTE system, and a U-LTE system, during communication by using an unlicensed spectrum resource, friendly coexistence with an existing communications system in which the unlicensed spectrum resource is used for communication needs to be considered. To achieve this objective, an LBT channel access mechanism is introduced in some countries and regions, for example, Europe and Japan. As specified by European regulations, an FBE-based LBT mechanism, an LBE-based LBT mechanism, and a CSMA/CA mechanism used in a Wi-Fi system are all satisfactory. The three channel access mechanisms are briefly described as follows.

The FBE-based LBT mechanism has the following feature: Before transmitting data on an operating channel, a device needs to perform CCA check on the channel in an energy detection manner within a time period starting from a fixed moment. A length of the time period should not be less than 20 μs, and generally, may be referred to as a CCA slot. If the device determines, by means of CCA check, that the channel is idle within a CCA slot, the device may start to send a signal in a format of a fixed frame period at a predefined moment. If the device determines, by means of CCA check, that the channel is occupied within a CCA slot, the device does not start CCA check until a next fixed moment arrives.

The LBE-based LBT mechanism has the following feature: Before transmitting data on an operating channel, a device may perform CCA check on the channel in an energy detection manner within a time period starting from any moment. A length of the time period should not be less than 20 μs, and generally, may be referred to as a CCA slot. During initial access, after determining, by means of CCA check, that the channel is idle within a CCA slot, the device may transmit a signal on the channel. However, the device needs to perform ECCA (Extended CCA) check once it is detected that the channel is occupied or when transmission time of the device on the channel reaches maximum transmission time allowed in a system. Each time before performing ECCA check, the device needs to generate a random integer N, and store the random integer N in a counter. N is a number randomly selected from 1 to q. N may be considered as a backoff length, and q may be considered as a length of a contention window. An ECCA check process is also a backoff process (or backoff procedure). Therefore, the contention window is also referred to as a backoff window. In a regulation of EN 301 893 Version 1.7.1, q is a value declared by a device, and a specific value may be selected from 4 to 32. Each time the device determines, by means of CCA check, whether the channel is idle within a CCA slot, if the channel is idle, a value of N in the counter decreases by 1; or if the channel is busy by detection, a value of N in the counter does not change. When the value of N in the counter decreases to 0, the device may start data transmission. Maximum channel occupancy time in each time of transmission should be less than $(13/32) \times q$ milliseconds.

The CSMA/CA mechanism used in the Wi-Fi system has the following feature: Each time before accessing a channel, a device needs to generate a pseudo random integer M evenly distributed in a range of [0, CW], and store the pseudo random integer M in a counter. CW is a length of a contention window, and M may be considered as a backoff length. The contention window in the Wi-Fi system has a predefined minimum value and a predefined maximum value. An initial value of CW is the predefined minimum value. In a CCA check process, each time before a backoff process starts, the device needs to first determine that the channel is idle within an interframe space (IFS). A length of the interframe space may protect response information transmitted by another Wi-Fi device from interference. IFSs of multiple different lengths are defined by the Wi-Fi for different service types, to differentiate priorities of different services. In an example of a distributed coordination function (DCF) service, the length of the IFS is a DIFS (DCF interframe space). In the CCA check process, the device needs to first determine that the channel is idle within the DIFS, and then starts the backoff process. In the backoff process, each time the device determines, by means of CCA check, whether the channel is idle within a backoff slot (backoff slot, which may also be referred to as a CCA slot), if the channel is idle, a value of M in the counter decreases by 1; or if the channel is busy by detection, a value of M in the counter does not change, and the device needs to determine again that the channel is idle within the DIFS, to resume the backoff process. When the value of M in the counter decreases to 0, the device may start data transmission. After each time of transmission ends, the device waits for ACK (Acknowledge, or positive acknowledgment) information returned for a correctly received data packet by a receive end. If the device correctly receives the ACK information, the length CW of the contention window is reset to the minimum value. If the device does not correctly receive the ACK information within predefined time, the length CW of the contention window is doubled.

It can be learned according to the foregoing description that, if the LAA system or another system in which the unlicensed spectrum resource is used complies only to the LBT mechanism required by the regulations, when the LAA system or the another system contends for a channel resource in an unlicensed spectrum with the Wi-Fi system, once resource collision occurs, there is a higher probability that a channel may be preempted in the LAA system or the another system. Consequently, a probability that the channel is accessed in the Wi-Fi system is reduced, and fair coexistence with the Wi-Fi system cannot be ensured.

For more fair and friendly coexistence of the LAA system and the Wi-Fi system, a direct manner is that a variable backoff window length similar to that used in the Wi-Fi is used in a channel access process in the LAA system. However, considering technical features of the LAA system and the Wi-Fi system, a backoff window adjustment condition of the Wi-Fi system cannot be directly used in the LAA system. Specific technical differences between the LAA system and the Wi-Fi system are as follows:

First, the LAA system and the Wi-Fi system have different protocol layer architecture. In the LAA system, there is a hybrid automatic repeat request (HARD) at a physical layer and an automatic repeat request (ARQ) in radio link control (RLC). A feedback includes both ACK information and NACK (negative acknowledgment) information. However, in the Wi-Fi system, there is only an ARQ at a MAC layer, and only an ACK is fed back and no NCK is fed back. Therefore, the backoff window adjustment condition cannot be applicable to the LAA system.

Next, the LAA system is based on a multiuser scheduling mechanism, and only single-user scheduling exists in the Wi-Fi system. When multiple users feed back ACKs, doubling of an exponential window in the single-user scheduling mechanism of the Wi-Fi system is not applicable to the LAA system.

Further, the LAA system has better interference immunity. When the LAA system coexists with the LAA system, even though particular interference exists, data may be correctly received in the LAA system; therefore, the LAA system may tolerate occurrence of particular collision. That is, when the LAA system coexists with the LAA system, the occurrence of particular collision is allowed, that is, a backoff window is allowed to keep unchanged. However, interference immunity of the Wi-Fi system is poorer than that of the LAA system, that is, once collision occurs, the backoff window in the Wi-Fi system is doubled regardless of coexistence with any system.

Finally, the LAA system is based on central scheduling, and more flexible backoff window adjustment is allowed, that is, a closed-loop-based feedback or open loop adjustment is allowed. However, doubling of the backoff window in the Wi-Fi system can be adjusted only according to a feedback from a receiving node, and open loop adjustment cannot be performed.

Therefore, according to features of the LAA system, a backoff window adjustment method that can be used in a multiuser scheduling system is proposed in the present disclosure, to ensure fair and friendly coexistence of different systems in an unlicensed spectrum. It should be noted that, in addition to that the LBT mechanism required by the regulations and the channel access mechanism used in the Wi-Fi system have different backoff window lengths and adjustment manners, an extra defer (defer, that is, before a backoff process, a device needs to ensure that a channel is idle within an IFS) is further introduced in the Wi-Fi system each time before the backoff process starts/resumes, and is used to protect response information transmitted by another device in the same system from interference. For the LAA system, response information is fed back 4 milliseconds after data packet transmission, and the response information may be fed back over another channel (such as a channel in a licensed spectrum) different from a channel for data packet transmission. Therefore, there is no need to introduce an extra defer each time before a backoff process starts/resumes. However, to ensure that different communications systems can fairly contend for a channel resource in the unlicensed spectrum, a case of introducing a similar defer mechanism in the channel access mechanism process in the unlicensed spectrum in the LAA system is not ruled out.

In the embodiments of the present disclosure, user equipment (UE), also referred to as a terminal, a mobile station, a mobile terminal, mobile user equipment, or the like, may communicate with one or more core networks by using a radio access network (RAN). The user equipment may be a mobile terminal, such as a mobile phone (or referred to as a "cellular" phone) or a computer with a mobile terminal. For example, the user equipment may be a portable, pocket-sized, handheld, computer built-in, or in-vehicle mobile apparatus, or may be a machine type communication device (MTC UE), which exchanges voice and/or data with the radio access network.

In the embodiments of the present disclosure, a base station may be an evolved NodeB eNB, a macro base station (macro), a micro base station (also referred to as a "small cell") (Pico), a picocell base station, an access point (AP), a transmission point (TP), or the like in an LTE system or an LAA-LTE system. This is not limited in the present disclosure. However, for ease of description, the base station and the user equipment are used as examples to describe the following embodiments.

The method and the apparatus can be applicable to another channel access mechanism in addition to LAA, which is not limited in the present disclosure.

FIG. 1 is a flowchart of a backoff window adjustment method according to a first embodiment of the present disclosure. As shown in FIG. 1, the method in this embodiment may include the following steps.

Step 101: A base station obtains first information that is used to instruct to adjust a backoff window on a first channel.

The base station may have multiple channels in a licensed spectrum and an unlicensed spectrum. In this embodiment, the first channel does not specifically refer to a channel of the base station. The first channel may be any channel of the multiple channels of the base station. The obtaining, by a base station, first information that is used to instruct to adjust a backoff window on a first channel may include at least one of the following steps:

obtaining, by the base station, the first information according to second information sent by at least one UE;

obtaining, by the base station, the first information according to a result of CCA on the first channel;

obtaining, by the base station, the first information according to a result of system collision detection on the first channel; or obtaining, by the base station, the first information according to whether a length of the backoff window on the first channel reaches a maximum length.

The second information sent by the UE may be: response information, and/or channel state information (CSI) information, and/or collision information. The response information includes ACK information and/or NACK information. The CSI information may be channel quality indicator (CQI) information, and/or channel precoding matrix indicator (PMI) information, and/or rank indicator (RI) information. The collision information is used to indicate whether the base station collides with a WI-FI system, an LAA system, or another system on the first channel. When multiple users are scheduled in a system, the UE may feed back multiple pieces of response information and/or collision information, and the first information may be obtained from the multiple pieces of response information and/or collision information. Therefore, the first information may be equivalent response information or equivalent collision information, the equivalent response information is equivalent ACK information or equivalent NACK information, and the equivalent collision information is equivalent collision or equivalent non-collision.

Step 102: The base station adjusts the backoff window according to the first information.

It should be noted that, in this embodiment and all embodiments of the present disclosure, a base station or UE or both need to contend for a channel before communicating by using a channel resource in the unlicensed spectrum. In a process in which the base station or the UE device or both execute a channel access mechanism, the backoff window is a reference value that is used to determine a backoff length before a backoff process starts. The backoff window may have a predefined minimum length and a predefined maximum length. Generally, an initial value of the backoff window may be the predefined minimum length. If the length of the backoff window is denoted by q, after the base station or the UE or both obtain, by contention, a use right of a channel according to a backoff window with the length of q, maximum channel occupancy time allowed in current transmission should be less than $(13/32) \times q$ milliseconds. Therefore, if the length of the backoff window is not a fixed value, the base station may notify the UE of the length of the backoff window in a manner of signaling notification, or predefine a backoff window adjustment rule, so that the UE can obtain the length of the backoff window according to the predefined rule. The UE may obtain corresponding maximum channel occupancy time information according to obtained backoff window length information.

In this embodiment, the backoff window may be the following several windows: the backoff window of the base station on the first channel, a backoff window that is of the base station on the first channel and that is used to schedule first UE, and a backoff window that is of the base station on the first channel and that is used to schedule UE in a first PMI indication direction. The first UE is any UE of all UE scheduled by the base station on the first channel. The first PMI indication direction is any PMI indication direction of all PMI indication directions in which the base station schedules UE on the first channel. When the backoff window is the backoff window of the base station on the first channel, backoff windows that are on the first channel of the base station and are used to schedule all UE are the same; when the backoff window is the backoff window that is of the base station on the first channel and that is used to schedule the first UE, and when the base station schedules different UE on the first channel, backoff windows used to schedule different UE are different; when the backoff window is the backoff window that is of the base station on the first channel and that is used to schedule UE in a PMI indication direction, and when the base station schedules UE in different PMI indication directions on the first channel, backoff windows used to schedule the UE in different PMI indication directions are different, and backoff windows used for scheduling UE in one PMI indication direction by the base station are the same.

In this embodiment, that the base station adjusts the backoff window includes the following three cases: The base station increases the backoff window, or the base station decreases the backoff window, or the base station keeps the backoff window unchanged.

It should be noted that, in this embodiment and the following embodiments, the base station may specifically increase the length of the backoff window in the following several manners: The base station exponentially increases the length of the backoff window, or the base station linearly increases the length of the backoff window, or the base station selects a larger length from a predefined backoff window length set, or the base station increases the backoff window to the maximum length, or the base station increases the length of the backoff window in another manner. The base station may specifically decrease the length of the backoff window in the following several manners: The base station exponentially decreases the length of the backoff window, or the base station linearly decreases the length of the backoff window, or the base station selects a smaller length from a predefined backoff window length set, or the base station backs off the length of the backoff window to the initial value, or the base station decreases the length of the backoff window in another manner.

In this embodiment, a base station obtains first information that is used to instruct to adjust a backoff window on a first channel, and then adjusts the backoff window according to the first information. When an LAA system and a WIFI system coexist, the LAA system and the WIFI system both adjust respective backoff windows, so that the WIFI system and LAA system can fairly contend for a channel resource after channel collision.

The following uses several specific embodiments to describe in detail the technical solutions of the method embodiment shown in FIG. 1.

Figure 2:
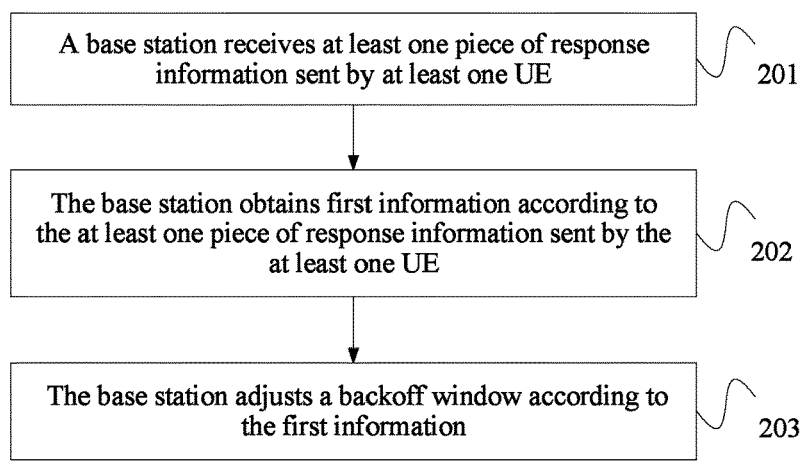
FIG. 2 is a flowchart of a backoff window adjustment method according to a second embodiment of the present disclosure.

FIG. 2 is a flowchart of a backoff window adjustment method according to a second embodiment of the present disclosure. In this embodiment, second information is response information sent by UE, and first information is equivalent response information. As shown in FIG. 2, the method provided in this embodiment may include the following steps.

Step 201: A base station receives at least one piece of response information sent by at least one UE.

The at least one piece of response information is response information sent by the at least one UE for at least one data packet transmitted on a first channel, and each of the at least one piece of response information may be ACK information or NACK information.

In an LAA system, the base station supports a multiuser scheduling mechanism. After the base station sends a data packet to the at least one UE over the first channel, the UE returns, to the base station, response information for the data packet transmitted on the first channel. In this embodiment, the first channel may include P scheduling units. Each scheduling unit includes a time domain resource and a frequency domain resource, and may be used to schedule at least one data packet. That a base station receives at least one piece of response information sent by at least one UE is specifically that the base station receives Q pieces of response information sent by the at least one UE in the P scheduling units on the first channel.

P is a positive integer that is not less than 1. It should be understood that, a defer between data packet transmission and a feedback of data packet response information is 4 milliseconds in the LAA system. When contending for a channel resource for current data transmission, the base station may still not receive response information corresponding to all scheduling units in previous transmission. Therefore, the P scheduling units may be all scheduling units or some scheduling units that are used by the base station in a previous scheduling period, or may be all scheduling units or some scheduling units that are used by the base station in historical scheduling. A quantity of all the scheduling units used by the base station in historical scheduling may be an average quantity of scheduling units used by the base station in historical scheduling on the first channel. The average quantity of the scheduling units used by the base station in historical scheduling on the first channel may be obtained by collecting statistics about historical scheduling data. In particular, if maximum channel occupancy time allowed in each time of transmission is relatively short, for example, 4 milliseconds, in this case, a backoff window used when the base station contends for a channel resource for the $i^{th}$ time of data transmission may be determined according to response information corresponding to a scheduling unit used in the $(i-2)^{th}$ time of data transmission.

Q is a positive integer that is not less than P. It should be understood that, when no spatial multiplexing exists in the system, each scheduling unit is used to schedule one data packet, and Q is equal to P; when spatial multiplexing exists in the system, each scheduling unit is used to schedule at least one data packet, and Q is greater than P. The Q pieces of response information received by the base station include ACK information and/or NACK information. When the UE correctly receives all data packets sent by the base station on the first channel, the Q pieces of response information are all the ACK information. When the UE correctly receives only some data packets sent by the base station on the first channel and the UE does not correctly receive some data packets sent by the base station on the first channel, the Q pieces of response information include the ACK information and the NACK information. When the UE correctly receives none of data packets sent by the base station on the first channel, the Q pieces of response information are all the NACK information.

Step 202: The base station obtains first information according to the at least one piece of response information sent by the at least one UE.

In this embodiment, the first information is equivalent response information. The obtaining, by the base station, first information according to the at least one piece of response information sent by the at least one UE includes at least one of the following steps:

obtaining, by the base station, a first value according to a ratio of a quantity of pieces of ACK information in the at least one piece of response information, to a total quantity of pieces of the at least one piece of response information, where if the first value is greater than a preset first threshold, the first information is equivalent ACK information;

obtaining, by the base station, a second value according to a ratio of a quantity of pieces of NACK information in the at least one piece of response information, to a total quantity of pieces of the at least one piece of response information, where if the second value is greater than a preset second threshold, the first information is equivalent NACK information;

obtaining, by the base station, a third value according to a quantity of pieces of ACK information in the at least one piece of response information, where if the third value is greater than a preset third threshold, the first information is equivalent ACK information; or obtaining, by the base station, a fourth value according to a quantity of pieces of NACK information in the at least one piece of response information, where if the fourth value is greater than a preset fourth threshold, the first information is equivalent NACK information.

In this embodiment, the first value and the second value both range from 0 to 1, and the first threshold and the second threshold both range between 0 and 1. The first value and the second value may be the same, or may be different. The third value and the fourth value are both integers greater than or equal to 0, and the third threshold and the fourth threshold are both positive integers greater than or equal to 1. The third threshold and the fourth threshold may be the same, or may be different.

Step 203: The base station adjusts a backoff window according to the first information.

The adjusting, by the base station, a backoff window according to the first information includes at least one of the following steps:

if the first information is the equivalent NACK information, increasing, by the base station, a backoff window of the base station on the first channel; or if the first information is the equivalent ACK information, decreasing, by the base station, a length of a backoff window of the base station on the first channel, or keeping, by the base station, a backoff window of the base station on the first channel unchanged.

If the first information is the equivalent NACK information, it indicates that there is a relatively high probability that collision occurs on the first channel. In this case, to avoid channel collision, the backoff window of the base station on the first channel should be increased, so that a probability that the base station is connected to the channel is reduced, and the channel collision is avoided. If the first information is the equivalent ACK information, it indicates that there is a relatively low probability that collision occurs on the first channel. In this case, to increase a system capacity, a probability that the base station is connected to the channel should be increased. Therefore, the backoff window of the base station on the first channel needs to be decreased, or the backoff window of the base station on the first channel needs to be kept unchanged. In specific implementation, the base station may determine, according to a current throughput of the LAA system and/or channel quality of the first channel, whether the backoff window of the base station on the first channel should be decreased or the backoff window of the base station on the first channel should be kept unchanged. For example, if the current throughput of the LAA system is quite low, and the channel quality of the first channel is quite good, the base station may decrease the backoff window of the base station on the first channel. If the current throughput of the LAA system is relatively high, the base station may keep the backoff window of the base station on the first channel unchanged.

In this embodiment, a base station receives at least one piece of response information sent by at least one UE, and obtains first information according to the at least one piece of response information. If the first information is equivalent NACK information, the base station increases a backoff window of the base station on a first channel; or if the first information is equivalent ACK information, the base station decreases a backoff window of the base station on a first channel, or the base station keeps a backoff window of the base station on a first channel unchanged. When an LAA system and a WIFI system coexist, the LAA system and the WIFI system both adjust respective backoff windows, so that the WIFI system and LAA system can fairly contend for a channel resource after channel collision.

Figure 3:
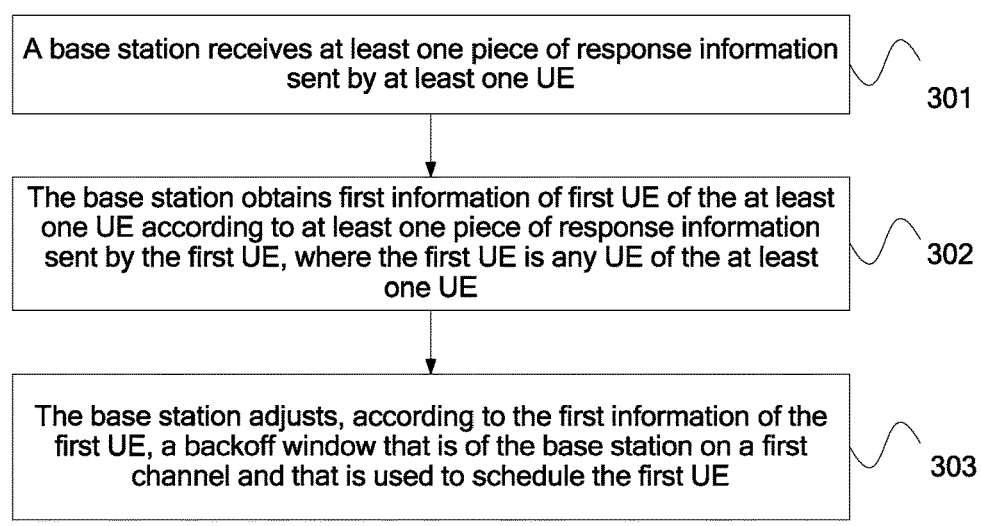
FIG. 3 is a flowchart of a backoff window adjustment method according to a third embodiment of the present disclosure.

FIG. 3 is a flowchart of a backoff window adjustment method according to a third embodiment of the present disclosure. A difference between this embodiment and the second embodiment is as follows: In this embodiment, a base station calculates equivalent response information of each UE, and adjusts, according to the equivalent response information of each UE, a backoff window that is of the base station on a first channel and that is used to schedule each UE. As shown in FIG. 3, the method provided in this embodiment may include the following steps.

Step 301: A base station receives at least one piece of response information sent by at least one UE.

For a specific implementation manner of this step, refer to related descriptions of step 201 in the second embodiment. Details are not described herein again.

Step 302: The base station obtains first information of first UE of the at least one UE according to at least one piece of response information sent by the first UE, where the first UE is any UE of the at least one UE.

In this embodiment, the first information of the first UE is equivalent response information of the first UE. The obtaining, by the base station, first information of first UE of the at least one UE according to at least one piece of response information sent by the first UE includes at least one of the following steps:

obtaining, by the base station, a fifth value according to a ratio of a quantity of pieces of ACK information in the at least one piece of response information sent by the first UE, to a total quantity of pieces of the at least one piece of response information sent by the first UE, where if the fifth value is greater than a preset fifth threshold, the first information of the first UE is equivalent ACK information;

obtaining, by the base station, a sixth value according to a ratio of a quantity of pieces of NACK information in the at least one piece of response information sent by the first UE, to a total quantity of pieces of the at least one piece of response information sent by the first UE, where if the sixth value is greater than a preset sixth threshold, the first information of the first UE is equivalent NACK information;

obtaining, by the base station, a seventh value according to a quantity of pieces of ACK information in the at least one piece of response information sent by the first UE, where if the seventh value is greater than a preset seventh threshold, the first information of the first UE is equivalent ACK information; or obtaining, by the base station, an eighth value according to a quantity of pieces of NACK information in the at least one piece of response information sent by the first UE, where if the eighth value is greater than a preset eighth threshold, the first information of the first UE is equivalent NACK information.

In this embodiment, the fifth value and the sixth value both range from 0 to 1, and the fifth threshold and the sixth threshold both range between 0 and 1. The fifth value and the sixth value may be the same, or may be different. The seventh value and the eighth value are both integers greater than or equal to 0, and the seventh threshold and the eighth threshold are both positive integers greater than or equal to 1. The seventh threshold and the eighth threshold may be the same, or may be different.

In this embodiment, the base station obtains equivalent response information of each UE according to at least one piece of response information sent by each UE. Because the response information of each UE may be different, first information of each UE obtained by the base station may also be different.

Step 303: The base station adjusts, according to the first information of the first UE, a backoff window that is of the base station on a first channel and that is used to schedule the first UE.

The adjusting, by the base station according to the first information of the first UE, a backoff window that is of the base station on the first channel and that is used to schedule the first UE includes at least one of the following steps:

if the first information of the first UE is the equivalent NACK information, increasing, by the base station, the backoff window that is of the base station on the first channel and that is used to schedule the first UE, or keeping, by the base station, the backoff window that is of the base station on the first channel and that is used to schedule the first UE, unchanged, and skipping, by the base station, scheduling the first UE within first time, where the first time may be of a predefined time length; or if the first information of the first UE is the equivalent ACK information, decreasing, by the base station, the backoff window that is of the base station on the first channel and that is used to schedule the first UE, or keeping, by the base station, the backoff window that is of the base station on the first channel and that is used to schedule the first UE, unchanged.

Because the first information of each UE may be different, an adjusted backoff window that is of the base station on the first channel and that is used to schedule each UE may be different. For example, for some UE, the base station may increase backoff windows that are of the base station on the first channel and are used to schedule the UE; for some UE, the base station may decrease backoff windows that are of the base station on the first channel and are used to schedule the UE; and for some UE, the base station may keep backoff windows that are of the base station on the first channel and are used to schedule the UE, unchanged.

In this embodiment, a base station receives at least one piece of response information sent by at least one UE, and the base station obtains first information of first UE of the at least one UE according to at least one piece of response information sent by the first UE, and adjusts, according to the first information of the first UE, a backoff window that is of the base station on a first channel and that is used to schedule the first UE. When an LAA system and a WIFI system coexist, the LAA system and the WIFI system both adjust respective backoff windows, so that the WIFI system and LAA system can fairly contend for a channel resource after channel collision.

Figure 4:
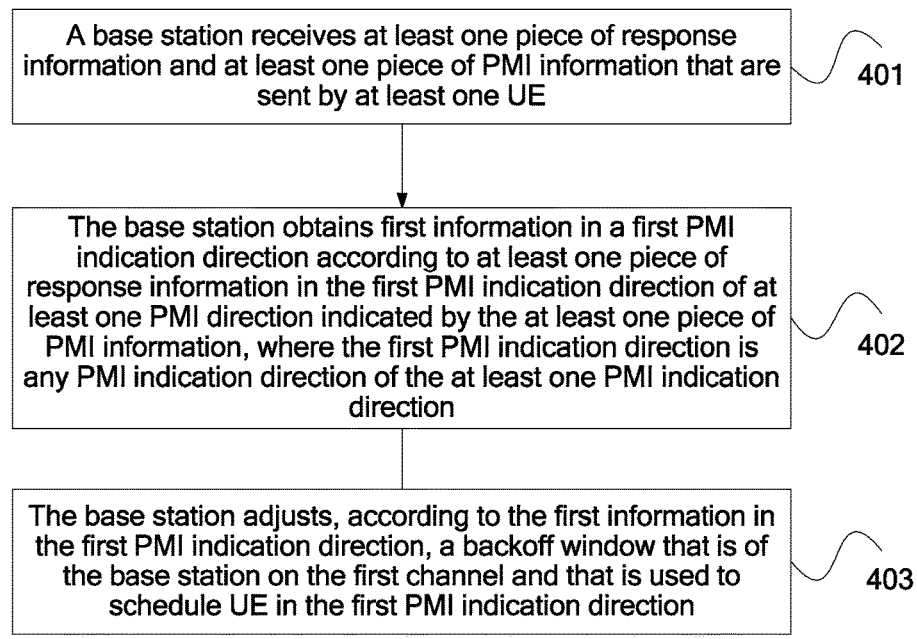
FIG. 4 is a flowchart of a backoff window adjustment method according to a fourth embodiment of the present disclosure.

FIG. 4 is a flowchart of a backoff window adjustment method according to a fourth embodiment of the present disclosure. In this embodiment, second information is response information and PMI information that are sent by UE. As shown in FIG. 4, the method provided in this embodiment may include the following steps.

Step 401: A base station receives at least one piece of response information and at least one piece of PMI information that are sent by at least one UE.

The at least one piece of PMI information is used to indicate at least one PMI indication direction. For a specific implementation manner in which the base station receives the at least one piece of response information sent by the at least one UE in this step, refer to related descriptions of step 201 in the second embodiment. Details are not described herein again.

Step 402: The base station obtains first information in a first PMI indication direction according to at least one piece of response information in the first PMI indication direction of at least one PMI direction indicated by the at least one piece of PMI information, where the first PMI indication direction is any PMI indication direction of the at least one PMI indication direction.

The obtaining, by the base station, first information in a first PMI indication direction according to at least one piece of response information in the first PMI indication direction of at least one PMI direction indicated by the at least one piece of PMI information includes at least one of the following steps:

obtaining, by the base station, a ninth value according to a ratio of a quantity of pieces of ACK information in the at least one piece of response information in the first PMI indication direction, to a total quantity of pieces of the at least one piece of response information in the first PMI indication direction, where if the ninth value is greater than a preset ninth threshold, the first information in the first PMI indication direction is equivalent ACK information;

obtaining, by the base station, a tenth value according to a ratio of a quantity of pieces of NACK information in the at least one piece of response information in the first PMI indication direction, to a total quantity of pieces of the at least one piece of response information in the first PMI indication direction, where if the tenth value is greater than a preset tenth threshold, the first information in the first PMI indication direction is equivalent NACK information;

obtaining, by the base station, an eleventh value according to a quantity of pieces of ACK information in the at least one piece of response information in the first PMI indication direction, where if the eleventh value is greater than a preset eleventh threshold, the first information in the first PMI indication direction is equivalent ACK information; or obtaining, by the base station, a twelfth value according to a quantity of pieces of NACK information in the at least one piece of response information in the first PMI indication direction, where if the twelfth value is greater than a preset twelfth threshold, the first information in the first PMI indication direction is equivalent NACK information.

In this embodiment, the ninth value and the tenth value both range from 0 to 1, and the ninth threshold and the tenth threshold both range between 0 and 1. The ninth value and the tenth value may be the same, or may be different. The eleventh value and the twelfth value are both integers greater than or equal to 0, and the eleventh threshold and the twelfth threshold are both positive integers greater than or equal to 1. The eleventh threshold and the twelfth threshold may be the same, or may be different.

It should be noted that, for one UE, when the UE transmits data in a spatial multiplexing mode, there may be more than one PMI direction. For PMIs with different ranks, precoding matrices may be different, but indication directions are the same. In this embodiment, that PMI indication directions are the same may mean that the indication directions are totally the same, or may mean that the indication directions are the same within an error range.

Step 403: The base station adjusts, according to the first information in the first PMI indication direction, a backoff window that is of the base station on the first channel and that is used to schedule UE in the first PMI indication direction.

The adjusting, by the base station according to the first information in the first PMI indication direction, a backoff window that is of the base station on the first channel and that is used to schedule UE in the first PMI indication direction includes at least one of the following steps:

if the first information in the first PMI indication direction is the equivalent NACK information, increasing, by the base station, the backoff window that is of the base station on the first channel and that is used to schedule the UE in the first PMI indication direction, or keeping, by the base station, the backoff window that is of the base station on the first channel and that is used to schedule the UE in the first PMI indication direction, unchanged, and skipping, by the base station, scheduling the UE in the first PMI indication direction within second time, where the second time may be of a predefined time length; or if the first information in the first PMI indication direction is the equivalent ACK information, decreasing, by the base station, the backoff window that is of the base station on the first channel and that is used to schedule the UE in the first PMI indication direction, or keeping, by the base station, the backoff window that is of the base station on the first channel and that is used to schedule the UE in the first PMI indication direction, unchanged.

In this embodiment, because first information in all PMI indication directions is different, adjusted backoff windows that are of the base station on the first channel and are used to schedule UE in all PMI indication directions are different. For example, for some PMI indication directions, the base station may increase backoff windows that are of the base station on the first channel and are used to schedule UE in the PMI indication directions; for some PMI indication directions, the base station may decrease backoff windows that are of the base station on the first channel and are used to schedule UE in the PMI indication directions; and for some PMI indication directions, the base station may keep backoff windows that are of the base station on the first channel and are used to schedule UE in the PMI indication directions, unchanged.

In this embodiment, a base station receives at least one piece of response information and at least one piece of PMI information that are sent by at least one UE, obtains first information in a first PMI indication direction according to at least one piece of response information in the first PMI indication direction of at least one PMI direction indicated by the at least one piece of PMI information, and adjusts, according to the first information in the first PMI indication direction, a backoff window that is of the base station on the first channel and that is used to schedule UE in the first PMI indication direction. When an LAA system and a WIFI system coexist, the LAA system and the WIFI system both adjust respective backoff windows, so that the WIFI system and LAA system can fairly contend for a channel resource after channel collision.

Figure 5:
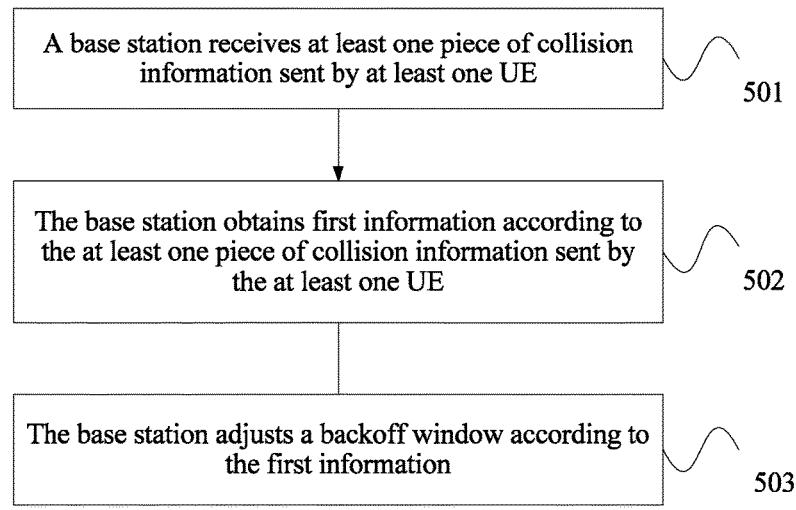
FIG. 5 is a flowchart of a backoff window adjustment method according to a fifth embodiment of the present disclosure.

FIG. 5 is a flowchart of a backoff window adjustment method according to a fifth embodiment of the present disclosure. In this embodiment, second information is collision information sent by UE. As shown in FIG. 5, the method provided in this embodiment may include the following steps.

Step 501: A base station receives at least one piece of collision information sent by at least one UE.

The collision information is used to indicate whether the base station collides with a WI-FI system, an LAA system, or another system on a first channel. In this embodiment, the UE detects channel collision, and after the UE detects that the base station collides with the WI-FI system, the LAA system, or the another system on the first channel, the UE sends collision information to the base station.

Step 502: The base station obtains first information according to the at least one piece of collision information sent by the at least one UE.

In this embodiment, the first information is equivalent collision information, and the equivalent collision information includes equivalent collision or equivalent non-collision. The obtaining, by the base station, first information according to the at least one piece of collision information sent by the at least one UE includes at least one of the following steps:

obtaining, by the base station, a thirteenth value according to a ratio of a quantity of pieces of information that is in the at least one piece of collision information and indicates no collision, to a total quantity of pieces of the at least one piece of collision information, where if the thirteenth value is greater than a preset thirteenth threshold, the first information is the equivalent non-collision;

obtaining, by the base station, a fourteenth value according to a ratio of a quantity of pieces of information that is in the at least one piece of collision information and indicates collision, to a total quantity of pieces of the at least one piece of collision information, where if the fourteenth value is greater than a preset fourteenth threshold, the first information is the equivalent collision;

obtaining, by the base station, a fifteenth value according to a quantity of pieces of information that is in the at least one piece of collision information and indicates no collision, where if the fifteenth value is greater than a preset fifteenth threshold, the first information is the equivalent non-collision; or obtaining, by the base station, a sixteenth value according to a quantity of pieces of information that is in the at least one piece of collision information and indicates collision, where if the sixteenth value is greater than a preset sixteenth threshold, the first information is the equivalent collision.

In this embodiment, the thirteenth value and the fourteenth value both range from 0 to 1, and the thirteenth threshold and the fourteenth threshold both range between 0 and 1. The thirteenth threshold and the fourteenth threshold may be the same, or may be different. The fifteenth value and the sixteenth value are both integers greater than or equal to 0, and the fifteenth threshold and the sixteenth threshold are both positive integers greater than or equal to 1. The fifteenth threshold and the sixteenth threshold may be the same, or may be different.

Step 503: The base station adjusts a backoff window according to the first information.

The adjusting, by the base station, a backoff window according to the first information includes at least one of the following steps: if the first information is the equivalent collision, increasing, by the base station, a backoff window of the base station on the first channel; or if the first information is the equivalent non-collision, decreasing, by the base station, a backoff window of the base station on the first channel, or keeping, by the base station, a backoff window of the base station on the first channel unchanged.

In this embodiment, a base station receives at least one piece of collision information sent by at least one UE, obtains first information according to the at least one piece of collision information sent by the at least one UE, and adjusts a backoff window of the base station on a first channel according to the first information. When an LAA system and a WIFI system coexist, the LAA system and the WIFI system both adjust respective backoff windows, so that the WIFI system and LAA system can fairly contend for a channel resource after channel collision.

Figure 6:
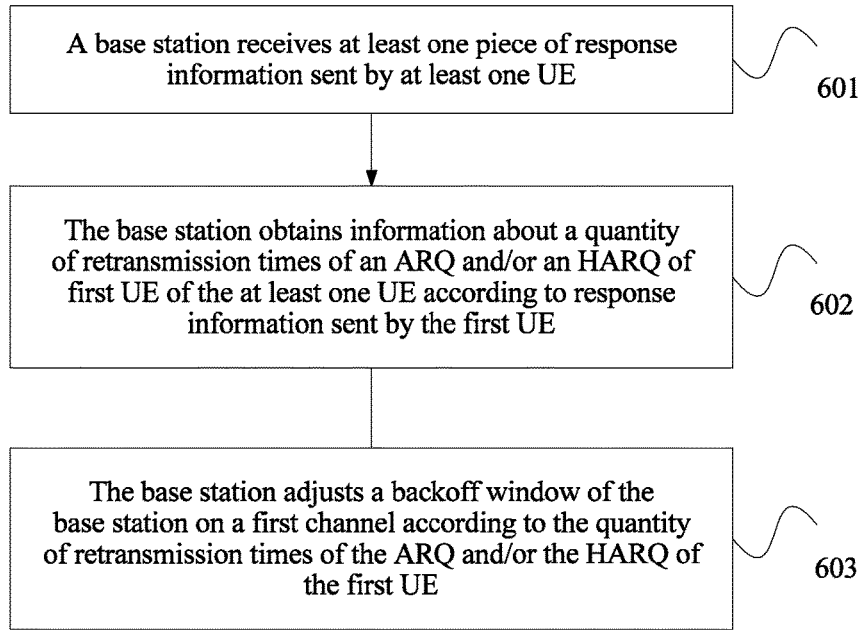
FIG. 6 is a flowchart of a backoff window adjustment method according to a sixth embodiment of the present disclosure.

FIG. 6 is a flowchart of a backoff window adjustment method according to a sixth embodiment of the present disclosure. In this embodiment, second information is response information sent by UE. As shown in FIG. 6, the method provided in this embodiment may include the following steps:

Step 601: A base station receives at least one piece of response information sent by at least one UE.

Step 602: The base station obtains information about a quantity of retransmission times of an ARQ and/or an HARQ of first UE of the at least one UE according to response information sent by the first UE.

The quantity of retransmission times of the ARQ and/or the HARQ of the first UE is first information.

Step 603: The base station adjusts a backoff window of the base station on a first channel according to the quantity of retransmission times of the ARQ and/or the HARQ of the first UE.

The adjusting, by the base station, a backoff window of the base station on a first channel according to the quantity of retransmission times of the ARQ and/or the HARQ of the first UE includes at least one of the following steps:

if the quantity of retransmission times of the ARQ and/or the HARQ of the first UE is greater than a preset seventeenth threshold, increasing, by the base station, the backoff window of the base station on the first channel; or if the quantity of retransmission times of the ARQ and/or the HARQ of the first UE is less than a preset eighteenth threshold, decreasing, by the base station, the backoff window of the base station on the first channel, or keeping, by the base station, the backoff window of the base station on the first channel unchanged.

In this embodiment, a base station receives at least one piece of response information sent by at least one UE, obtains information about a quantity of retransmission times of an ARQ and/or an HARQ of first UE of the at least one UE according to response information sent by the first UE, and adjusts a length of a backoff window of the base station on a first channel according to the quantity of retransmission times of the ARQ and/or the HARQ of the first UE. When an LAA system and a WIFI system coexist, the LAA system and the WIFI system both adjust respective backoff windows, so that the WIFI system and LAA system can fairly contend for a channel resource after channel collision.

Figure 7:
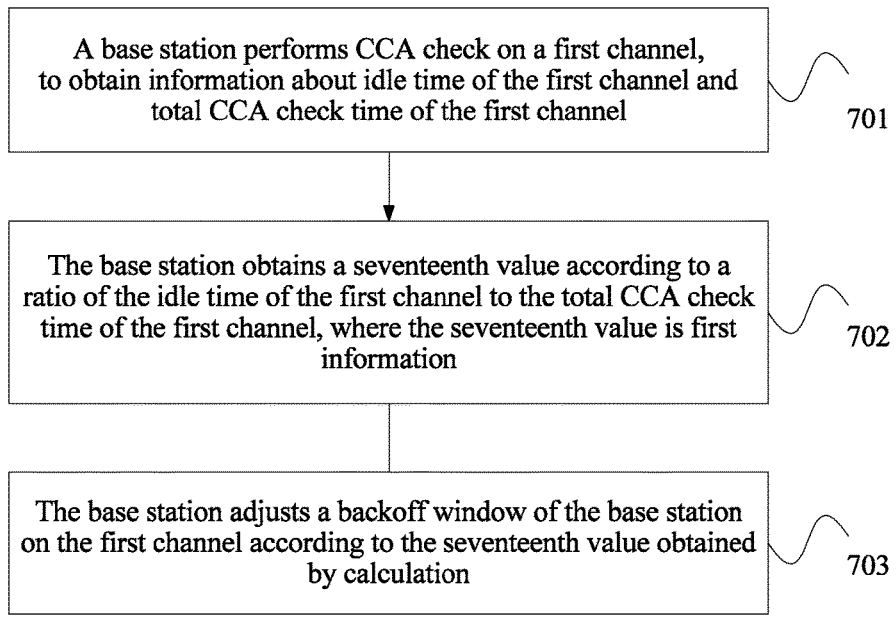
FIG. 7 is a flowchart of a backoff window adjustment method according to a seventh embodiment of the present disclosure.

FIG. 7 is a flowchart of a backoff window adjustment method according to a seventh embodiment of the present disclosure. In this embodiment, an example in which a base station obtains first information according to a result of CCA on a first channel is used for description. As shown in FIG. 7, the method provided in this embodiment may include the following steps:

Step 701: A base station performs CCA check on a first channel, to obtain information about idle time of the first channel and total CCA check time of the first channel.

The base station detects, within each detection time period, whether the first channel is idle, to obtain an idle status of the first channel within each detection time period.

Step 702: The base station obtains a seventeenth value according to a ratio of the idle time of the first channel to the total CCA check time of the first channel, where the seventeenth value is first information.

Specifically, the base station determines the idle time of the first channel according to CCA check, and uses the ratio of the idle time of the first channel to the total CCA check time of the first channel as the seventeenth value.

Alternatively, the base station finds continuous idle time from all idle time according to the information about the idle time of the first channel. The continuous idle time refers to time during which the first channel is idle within one or more consecutive detection time periods. There may be multiple continuous idle time periods within the total CCA check time. The base station determines a largest value from the multiple continuous idle time periods, and uses a ratio of the largest value to the total CCA check time as the seventeenth value. For example, if the total CCA check time is 500 µs, and there are a total of two continuous idle time periods within the total CCA check time: a first continuous idle time period is 60 µs, and a second continuous idle time period is 100 µs, the base station uses a ratio of the second continuous idle time period to the total CCA check time as the seventeenth value.

Step 703: The base station adjusts a backoff window of the base station on the first channel according to the seventeenth value obtained by calculation.

The adjusting, by the base station, a length of a backoff window of the base station on the first channel according to the seventeenth value obtained by calculation includes at least one of the following steps:

if the seventeenth value is less than a preset nineteenth threshold, increasing, by the base station, the backoff window of the base station on the first channel; or if the seventeenth value is greater than a preset twentieth threshold, decreasing, by the base station, the backoff window of the base station on the first channel, or keeping, by the base station, the backoff window of the base station on the first channel unchanged.

In this embodiment, the seventeenth value ranges from 0 to 1, and the nineteenth threshold and the twentieth threshold both range between 0 and 1.

It should be noted that, a special case in this embodiment is that the base station performs CCA check on the first channel, to obtain the information about the idle time of the first channel, and the base station adjusts the backoff window of the base station on the first channel only according to a length of the idle time, which includes at least one of the following steps:

if the length of the idle time is less than a preset time length, increasing, by the base station, the backoff window of the base station on the first channel; or if the length of the idle time is greater than another preset time length, decreasing, by the base station, the backoff window of the base station on the first channel, or keeping, by the base station, the backoff window of the base station on the first channel unchanged.

In this embodiment, a base station performs CCA check on a first channel, to obtain information about idle time of the first channel and total CCA check time of the first channel, and adjusts a length of a backoff window of the base station on the first channel according to a ratio of the information about the idle time of the first channel to the total CCA check time of the first channel. When an LAA system and a WIFI system coexist, the LAA system and the WIFI system both adjust respective backoff windows, so that the WIFI system and LAA system can fairly contend for a channel resource after channel collision.

Figure 8:
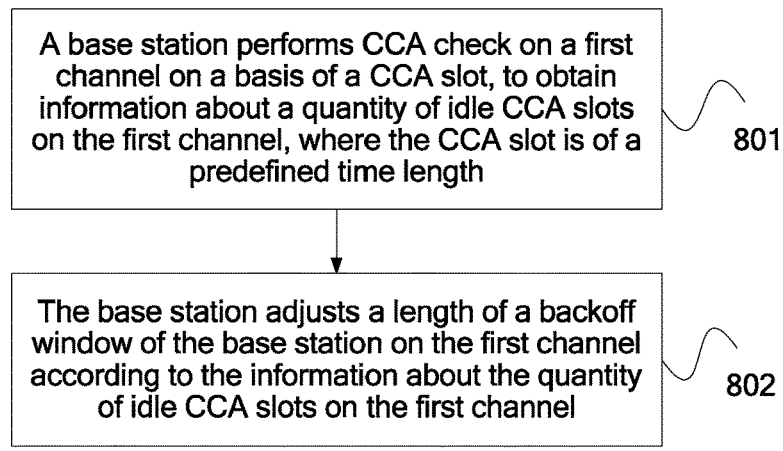
FIG. 8 is a flowchart of a backoff window adjustment method according to an eighth embodiment of the present disclosure.

FIG. 8 is a flowchart of a backoff window adjustment method according to an eighth embodiment of the present disclosure. In this embodiment, an example in which a base station obtains first information according to a result of CCA on a first channel is used for description. As shown in FIG. 8, the method provided in this embodiment may include the following steps:

Step 801: A base station performs CCA check on a first channel on a basis of a CCA slot, to obtain information about a quantity of idle CCA slots on the first channel, where the CCA slot is of a predefined time length.

It is assumed that a length of a backoff window of the base station on the first channel at a current moment includes a total of M CCA slots. Before executing a backoff process, the base station first needs to generate a random number N between 0 and M, and then detects an idle status of the first channel within the M CCA slots, to obtain the information about the quantity of idle CCA slots on the first channel.

Step 802: The base station adjusts a length of a backoff window of the base station on the first channel according to the information about the quantity of idle CCA slots on the first channel.

Each time the base station detects one idle CCA slot of the first channel, the generated random number N decreases by 1. When the random number N decreases to 0, the base station may send data. In this process, the base station determines whether at least N idle CCA slots are detected within the M CCA slots on the first channel. The at least N idle CCA slots may be discontinuous, or may be continuous.

The adjusting, by the base station, a length of a backoff window of the base station on the first channel according to the information about the quantity of idle CCA slots on the first channel includes at least one of the following steps:

if the base station does not detect N idle CCA slots within a time length of the M CCA slots on the first channel, increasing, by the base station, the backoff window of the base station on the first channel; or if the base station detects at least N idle CCA slots within a time length of the M CCA slots on the first channel, decreasing, by the base station, the backoff window of the base station on the first channel, or keeping, by the base station, the backoff window of the base station on the first channel unchanged.

In this embodiment, a base station performs CCA check on a first channel on a basis of a CCA slot, to obtain information about a quantity of idle CCA slots on the first channel, and adjusts a backoff window of the base station on the first channel according to the information about the quantity of idle CCA slots on the first channel. When an LAA system and a WIFI system coexist, the LAA system and the WIFI system both adjust respective backoff windows, so that the WIFI system and LAA system can fairly contend for a channel resource after channel collision.

Figure 9:
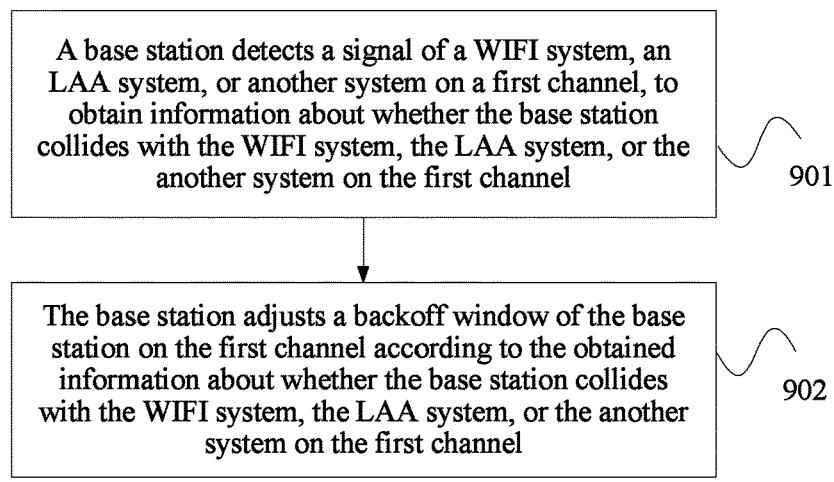
FIG. 9 is a flowchart of a backoff window adjustment method according to a ninth embodiment of the present disclosure.

FIG. 9 is a flowchart of a backoff window adjustment method according to a ninth embodiment of the present disclosure. In this embodiment, an example in which a base station obtains, according to a result of system collision detection on a first channel, a trigger condition for adjusting a length of a backoff window on the first channel is used for description. As shown in FIG. 9, the method provided in this embodiment may include the following steps:

Step 901: A base station detects a signal of a WIFI system, an LAA system, or another system on a first channel, to obtain information about whether the base station collides with the WI-FI system, the LAA system, or the another system on the first channel.

If the base station detects the signal of the WIFI system, the LAA system, or the another system on the first channel, it indicates that the base station collides with the WI-FI system, the LAA system, or the another system on the first channel. If the base station does not detect the signal of the WIFI system, the LAA system, or the another system on the first channel, it indicates that the base station does not collide with the WI-FI system, the LAA system, or the another system on the first channel.

Step 902: The base station adjusts a backoff window of the base station on the first channel according to the obtained information about whether the base station collides with the WI-FI system, the LAA system, or the another system on the first channel.

Step 902 specifically includes at least one of the following steps:

if the information about whether the base station collides with the WI-FI system, the LAA system, or the another system on the first channel indicates system collision, increasing, by the base station, the backoff window of the base station on the first channel; or if the information about whether the base station collides with the WI-FI system, the LAA system, or the another system on the first channel indicates no system collision, decreasing, by the base station, the backoff window of the base station on the first channel, or keeping, by the base station, the backoff window of the base station on the first channel unchanged.

In this embodiment, a base station detects on a signal of a WIFI system, an LAA system, or another system on a first channel, to obtain information about whether the base station collides with the WI-FI system, the LAA system, or the another system on the first channel, and adjusts a length of a backoff window of the base station on the first channel according to the obtained information about whether the base station collides with the WI-FI system, the LAA system, or the another system on the first channel. When an LAA system and a WIFI system coexist, the LAA system and the WIFI system both adjust respective backoff windows, so that the WIFI system and LAA system can fairly contend for a channel resource after channel collision.

In addition to adjusting, by the base station, the length of the backoff window of the base station on the first channel by using the methods in the first embodiment to the ninth embodiment, the base station may further perform adjustment in the following manners: The base station determines whether the length of the backoff window of the base station on the first channel reaches the maximum length, and whether a case in which the maximum length is reached maintains P times; and if the length of the backoff window of the base station on the first channel reaches the maximum length and this case maintains P times, the base station decreases the backoff window of the base station on the first channel, where P is an integer that is not less than 0.

It should be understood that, in addition to adjusting the length of the backoff window of the base station on the first channel by using the methods in the foregoing embodiments, the base station may further perform adjustment in the following manners: When the base station preempts a relatively large quantity of data transmission opportunities within historical third time, the base station increases the backoff window of the base station on the first channel, so that a device that shares an unlicensed spectrum resource in a neighboring cell obtains a relatively large quantity of access opportunities, showing friendliness to a neighboring coexisting system (such as a Wi-Fi device or another LAA device). The third time may be of a semi-statically configured time length.

It should be noted that, when the base station receives both at least one piece of response information sent by at least one UE and collision information sent by at least one UE, first information obtained by the base station according to the methods described in the second embodiment and the ninth embodiment includes equivalent response information and equivalent collision information. The adjusting, by the base station, the backoff window according to the first information includes at least one of the following steps:

if the first information is equivalent NACK information and/or equivalent collision information that indicates collision, increasing, by the base station, the backoff window of the base station on the first channel; or if the first information is equivalent ACK information and/or equivalent collision information that indicates no collision, decreasing, by the base station, the length of the backoff window of the base station on the first channel, or keeping, by the base station, the backoff window of the base station on the first channel unchanged.

In the foregoing embodiments, how a base station adjusts a backoff window in a downlink data transmission process is described. In the following embodiments, how UE adjusts a length of a backoff window of the UE on a first channel in an uplink data transmission process is described.

Figure 10:
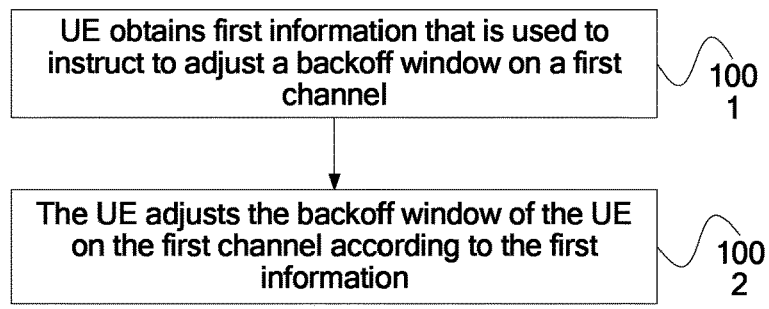
FIG. 10 is a flowchart of a backoff window adjustment method according to a tenth embodiment of the present disclosure.

FIG. 10 is a flowchart of a backoff window adjustment method according to a tenth embodiment of the present disclosure. As shown in FIG. 10, the method provided in this embodiment may include the following steps:

Step 1001: UE obtains first information that is used to instruct to adjust a backoff window on a first channel.

The obtaining, by UE, first information that is used to instruct to adjust a backoff window on a first channel may include at least one of the following steps:

obtaining, by the UE, the first information according to second information sent by a base station;

obtaining, by the UE, the first information according to a result of CCA on the first channel;

obtaining, by the UE, the first information according to a result of system collision detection on the first channel; or obtaining, by the UE, the first information according to whether a length of the backoff window on the first channel reaches a maximum length.

The second information sent by the base station may be response information or backoff window adjustment indication information. The response information includes ACK information and/or NACK information. The backoff window adjustment indication information is used to indicate whether the UE adjusts the length of the backoff window. Therefore, the first information may be equivalent response information or the backoff window adjustment indication information, the equivalent response information is equivalent ACK information or equivalent NACK information, and the backoff window adjustment indication information instructs whether to adjust the backoff window or not.

Step 1002: The UE adjusts the backoff window of the UE on the first channel according to the first information.

In this embodiment, the adjusting, by the UE, the backoff window of the UE on the first channel includes the following three cases: increasing, by the UE, the length of the backoff window of the UE on the first channel, or decreasing, by the UE, the length of the backoff window of the UE on the first channel, or keeping, by the UE, the length of the backoff window of the UE on the first channel unchanged.

It should be noted that, in this embodiment and the following embodiments, the UE may specifically increase the length of the backoff window in the following manners: The UE exponentially increases the backoff window, or the UE linearly increases the backoff window, or the UE selects a larger length from a predefined backoff window length set, or the UE increases the backoff window to the maximum length, or the UE increases the backoff window in another manner. The UE may specifically decrease the backoff window in the following manners: The UE exponentially decreases the backoff window, or the UE linearly decreases the backoff window, or the UE selects a smaller length from a predefined backoff window length set, or the UE backs off the length of the backoff window to an initial value, or the UE decreases the backoff window in another manner.

In this embodiment, UE obtains first information that is used to instruct to adjust a backoff window on a first channel, and adjusts a length of the backoff window of the UE on the first channel according to the first information. When an LAA system and a WIFI system coexist, the LAA system and the WIFI system both adjust respective backoff windows, so that the WIFI system and LAA system can fairly contend for a channel resource after channel collision.

The following uses several specific embodiments to describe in detail the technical solutions of the method embodiment shown in FIG. 10.

Figure 11:
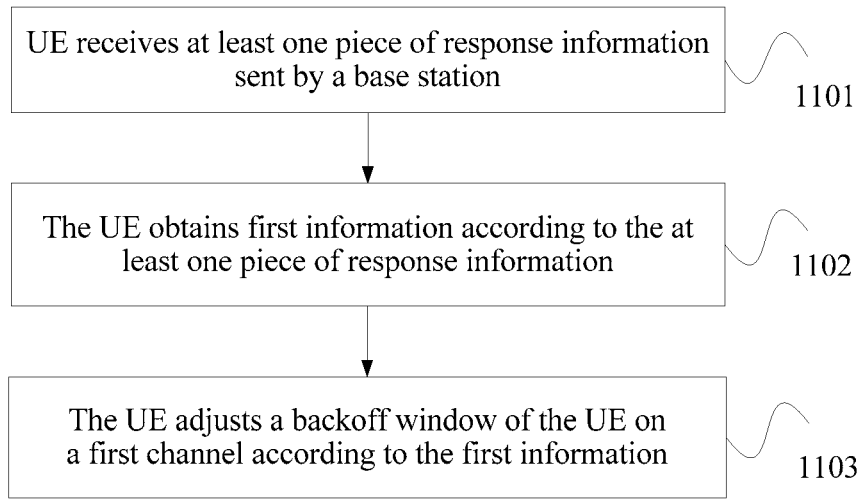
FIG. 11 is a flowchart of a backoff window adjustment method according to an eleventh embodiment of the present disclosure.

FIG. 11 is a flowchart of a backoff window adjustment method according to an eleventh embodiment of the present disclosure. In this embodiment, second information is response information sent by UE. As shown in FIG. 11, the method provided in this embodiment may include the following steps:

Step 1101: UE receives at least one piece of response information sent by a base station.

The at least one piece of response information is at least one piece of feedback information of the base station for a data packet transmitted on a first channel. Each piece of the at least one piece of response information is ACK information or NACK information.

Step 1102: The UE obtains first information according to the at least one piece of response information.

Step 1103: The UE adjusts a backoff window of the UE on a first channel according to the first information.

Step 1103 may specifically include at least one of the following steps:

if the at least one piece of response information includes at least one piece of NACK information, increasing, by the UE, the backoff window of the UE on the first channel; or if the at least one piece of response information includes at least one piece of ACK information, decreasing, by the UE, the backoff window of the UE on the first channel, or keeping, by the UE, the backoff window of the UE on the first channel unchanged.

In this embodiment, UE receives at least one piece of response information sent by a base station, obtains first information according to the at least one piece of received response information, and adjusts a length of a backoff window of the UE on a first channel according to the first information. When an LAA system and a WIFI system coexist, the LAA system and the WIFI system both adjust respective backoff windows, so that the WIFI system and LAA system can fairly contend for a channel resource after channel collision.

Figure 12:
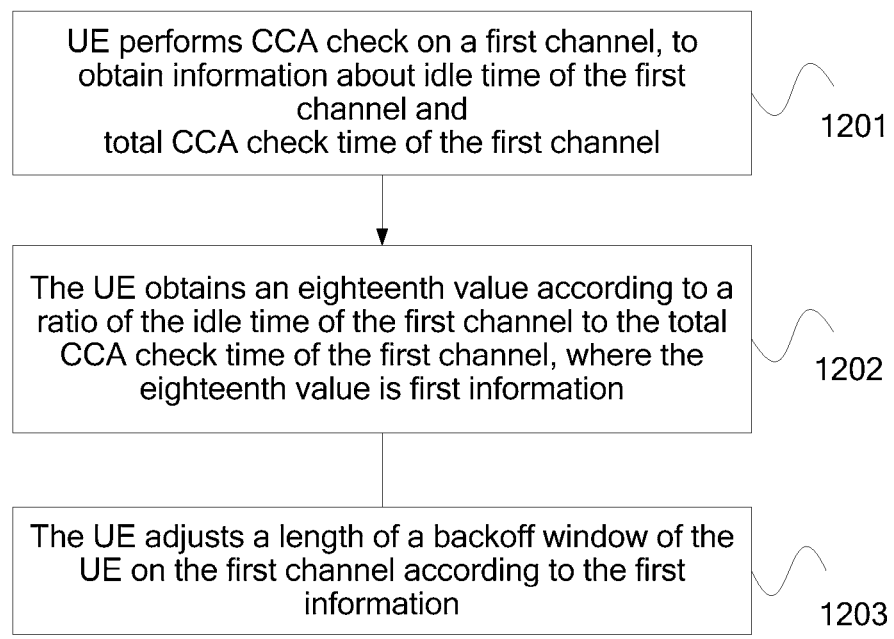
FIG. 12 is a flowchart of a backoff window adjustment method according to a twelfth embodiment of the present disclosure.

FIG. 12 is a flowchart of a backoff window adjustment method according to a twelfth embodiment of the present disclosure. In this embodiment, an example in which UE obtains first information according to a result of CCA on a first channel is used for description. As shown in FIG. 12, the method provided in this embodiment may include the following steps:

Step 1201: UE performs CCA check on a first channel, to obtain information about idle time of the first channel and total CCA check time of the first channel.

Step 1202: The UE obtains an eighteenth value according to a ratio of the idle time of the first channel to the total CCA check time of the first channel, where the eighteenth value is first information.

For specific implementation manners of step 1201 and step 1202, refer to related descriptions in the seventh embodiment. Details are not described herein again. A difference between this embodiment and the seventh embodiment is that the two embodiments are executed by different entities.

Step 1203: The UE adjusts a length of a backoff window of the UE on the first channel according to the first information.

Step 1203 specifically includes at least one of the following steps:

if the eighteenth value is less than a preset twenty-first threshold, increasing, by the UE, the backoff window of the UE on the first channel; or if the eighteenth value is greater than a preset twenty-second threshold, decreasing, by the UE, the backoff window of the UE on the first channel, or keeping, by the UE, the backoff window of the UE on the first channel unchanged.

In this embodiment, UE performs CCA check on a first channel, to obtain information about idle time of the first channel and total CCA check time of the first channel, obtains first information according to a ratio of the information about the idle time of the first channel to the total CCA check time of the first channel, and adjusts a length of a backoff window of the UE on the first channel according to the first information. When an LAA system and a WIFI system coexist, the LAA system and the WIFI system both adjust respective backoff windows, so that the WIFI system and LAA system can fairly contend for a channel resource after channel collision.

Figure 13:
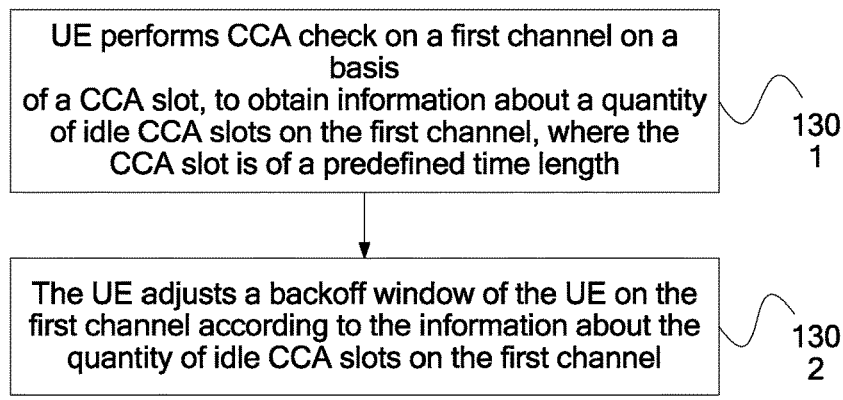
FIG. 13 is a flowchart of a backoff window adjustment method according to a thirteenth embodiment of the present disclosure.

FIG. 13 is a flowchart of a backoff window adjustment method according to a thirteenth embodiment of the present disclosure. In this embodiment, an example in which UE obtains first information according to a result of CCA on a first channel is used for description. As shown in FIG. 13, the method provided in this embodiment may include the following steps:

Step 1301: UE performs CCA check on a first channel on a basis of a CCA slot, to obtain information about a quantity of idle CCA slots on the first channel, where the CCA slot is of a predefined time length.

Step 1302: The UE adjusts a backoff window of the UE on the first channel according to the information about the quantity of idle CCA slots on the first channel.

Step 1302 may specifically include at least one of the following steps:

if the UE does not detect N idle CCA slots within a time length of M CCA slots on the first channel, increasing, by the UE, the backoff window of the UE on the first channel; or if the UE detects N idle CCA slots within a time length of M CCA slots on the first channel, decreasing, by the UE, the backoff window of the UE on the first channel, or keeping, by the UE, the backoff window of the UE on the first channel unchanged, where the time length of the M CCA slots is a current length of the backoff window of the UE on the first channel, and N is a random number, between 0 and M, randomly generated by the UE.

For a specific implementation manner of this embodiment, refer to related descriptions in the eighth embodiment. Details are not described herein again. A difference between this embodiment and the eighth embodiment is that the two embodiments are executed by different entities.

In this embodiment, UE performs CCA check on a first channel on a basis of a CCA slot, to obtain information about a quantity of idle CCA slots on the first channel, and adjusts a length of a backoff window of the UE on the first channel according to the information about the quantity of idle CCA slots on the first channel. When an LAA system and a WIFI system coexist, the LAA system and the WIFI system both adjust respective backoff windows, so that the WIFI system and LAA system can fairly contend for a channel resource after channel collision.

Figure 14:
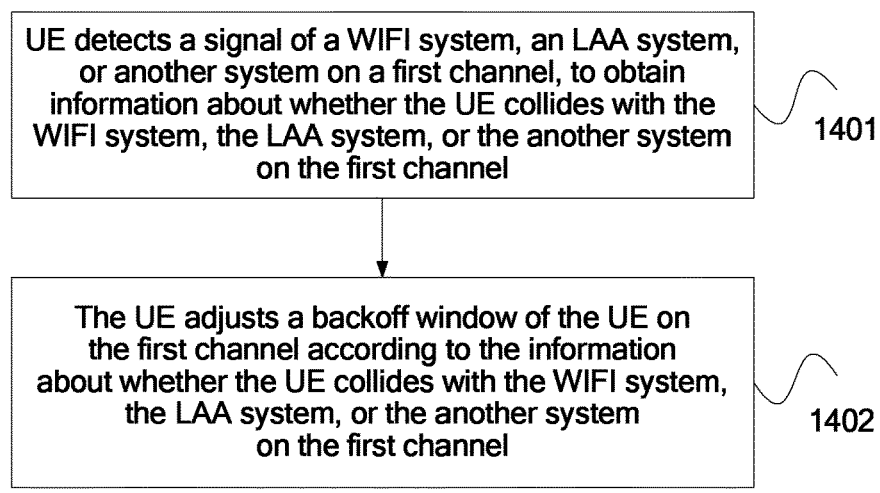
FIG. 14 is a flowchart of a backoff window adjustment method according to a fourteenth embodiment of the present disclosure.

FIG. 14 is a flowchart of a backoff window adjustment method according to a fourteenth embodiment of the present disclosure. In this embodiment, an example in which UE obtains first information according to a result of system collision detection on a first channel is used for description. As shown in FIG. 14, the method provided in this embodiment may include the following steps:

Step 1401: UE detects a signal of a WI-FI system, an LAA system, or another system on a first channel, to obtain information about whether the UE collides with the WI-FI system, the LAA system, or the another system on the first channel.

If the UE detects the signal of the WI-FI system, the LAA system, or the another system on the first channel, the UE determines that the UE collides with the WI-FI system, the LAA system, or the another system on the first channel. If the UE does not detect the signal of the WI-FI system, the LAA system, or the another system on the first channel, the UE determines that the UE does not collide with the WI-FI system, the LAA system, or the another system on the first channel.

Step 1402: The UE adjusts a backoff window of the UE on the first channel according to the information about whether the UE collides with the WI-FI system, the LAA system, or the another system on the first channel.

Step 1402 may specifically include at least one of the following steps:

if the information about whether the UE collides with the WI-FI system, the LAA system, or the another system on the first channel indicates system collision, increasing, by the UE, the backoff window of the UE on the first channel; or if the information about whether the UE collides with the WI-FI system, the LAA system, or the another system on the first channel indicates no system collision, decreasing, by the UE, the backoff window of the UE on the first channel, or keeping, by the UE, the backoff window of the UE on the first channel unchanged.

In this embodiment, if the UE detects the signal of the WIFI system or another LAA system on the first channel, it indicates that the first channel is interfered by the signal of the WIFI system or the another LAA system on the first channel. In this case, the UE increases the backoff window of the UE on the first channel. This can avoid interference to uplink data sent by the UE.

In this embodiment, UE detects a signal of a WI-FI system, an LAA system, or another system on a first channel, to obtain information about whether the UE collides with the WI-FI system, the LAA system, or the another system on the first channel, and adjusts a backoff window of the UE on the first channel according to the information about whether the UE collides with the WI-FI system, the LAA system, or the another system on the first channel. When an LAA system and a WIFI system coexist, the LAA system and the WIFI system both adjust respective backoff windows, so that the WIFI system and LAA system can fairly contend for a channel resource after channel collision.

In addition to the adjusting, by the UE, the length of the backoff window of the UE on the first channel by using the methods in the tenth embodiment to the fourteenth embodiment, the UE may further perform adjustment in the following manners: The UE determines whether the length of the backoff window of the UE on the first channel reaches the maximum length, and whether a case in which the maximum length is reached maintains P times; and if the length of the backoff window of the UE on the first channel reaches the maximum length and this case maintains P times, the UE decreases the backoff window of the UE on the first channel, where P is an integer that is not less than 0.

Figure 15:
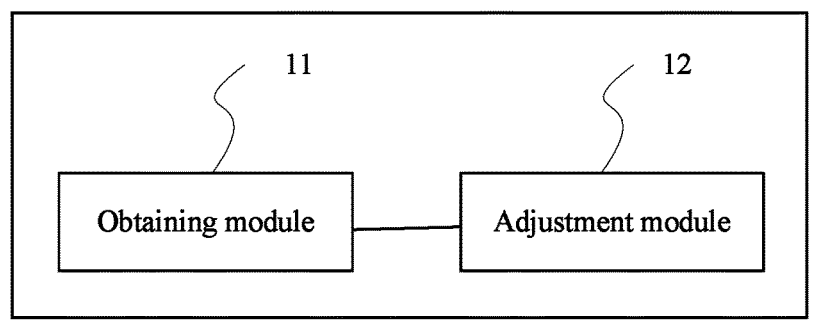
FIG. 15 is a schematic structural diagram of a base station according to a fifteenth embodiment of the present disclosure.

FIG. 15 is a schematic structural diagram of a base station according to a fifteenth embodiment of the present disclosure. As shown in FIG. 15, the base station provided in this embodiment includes an obtaining module 11 and an adjustment module 12.

The obtaining module 11 is configured to obtain first information that is used to instruct to adjust a backoff window on a first channel.

The adjustment module 12 is configured to adjust the backoff window according to the first information.

The obtaining, by the obtaining module 11, the first information includes at least one of the following steps:

obtaining the first information according to second information sent by at least one UE;

obtaining the first information according to a result of CCA on the first channel;

obtaining the first information according to a result of system collision detection on the first channel; or obtaining the first information according to whether a length of the backoff window on the first channel reaches a maximum length.

The base station provided in this embodiment can be configured to execute the method in the first embodiment. A specific implementation manner and a technical effect are similar to those of the method in the first embodiment, and details are not described herein again.

Figure 16:
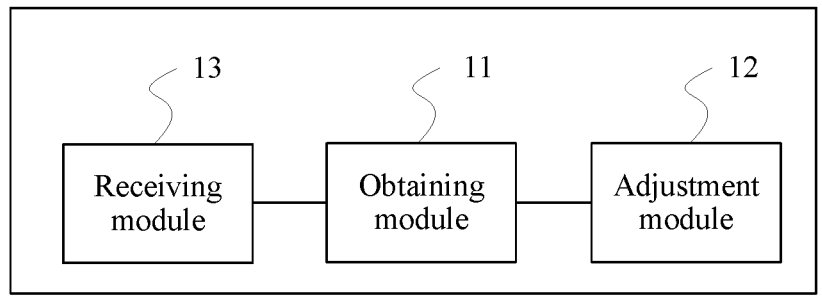
FIG. 16 is a schematic structural diagram of a base station according to a sixteenth embodiment of the present disclosure.

FIG. 16 is a schematic structural diagram of a base station according to a sixteenth embodiment of the present disclosure. As shown in FIG. 16, on a basis of a structure of the base station shown in FIG. 15, the base station provided in this embodiment further includes a receiving module 13. In this embodiment, the second information is response information.

The receiving module 13 is configured to receive at least one piece of response information sent by the at least one UE, where the at least one piece of response information is response information that is sent by the at least one UE and that is corresponding to at least one data packet transmitted on the first channel, and each of the at least one piece of response information is ACK information or NACK information.

The obtaining, by the obtaining module 11, the first information according to second information sent by at least one UE includes: obtaining the first information according to the at least one piece of response information sent by the at least one UE.

The adjusting, by the adjustment module 12, the backoff window according to the first information includes at least one of the following steps: if the first information is equivalent NACK information, increasing the backoff window of the base station on the first channel; or if the first information is equivalent ACK information, decreasing the backoff window of the base station on the first channel, or keeping the backoff window of the base station on the first channel unchanged.

In this embodiment, the obtaining, by the obtaining module 11, the first information according to the at least one piece of response information sent by the at least one UE may include at least one of the following steps:

obtaining a first value according to a ratio of a quantity of pieces of ACK information in the at least one piece of response information, to a total quantity of pieces of the at least one piece of response information, where if the first value is greater than a preset first threshold, the first information is the equivalent ACK information;

obtaining a second value according to a ratio of a quantity of pieces of NACK information in the at least one piece of response information, to a total quantity of pieces of the at least one piece of response information, where if the second value is greater than a preset second threshold, the first information is the equivalent NACK information;

obtaining a third value according to a quantity of pieces of ACK information in the at least one piece of response information, where if the third value is greater than a preset third threshold, the first information is the equivalent ACK information; or obtaining a fourth value according to a quantity of pieces of NACK information in the at least one piece of response information, where if the fourth value is greater than a preset fourth threshold, the first information is the equivalent NACK information.

The base station provided in this embodiment can be configured to execute the method in the second embodiment. A specific implementation manner and a technical effect are similar to those of the method in the second embodiment, and details are not described herein again.

A seventeenth embodiment of the present disclosure provides a base station. The base station provided in this embodiment has a same structure as the base station shown in FIG. 16. Referring to FIG. 16, in this embodiment, the receiving module 13 is configured to receive at least one piece of response information sent by the at least one UE, where the at least one piece of response information is response information that is sent by the at least one UE and that is corresponding to at least one data packet transmitted on the first channel, and each of the at least one piece of response information is ACK information or NACK information.

The obtaining, by the obtaining module 11, the first information according to the second information sent by the at least one user equipment UE includes: obtaining first information of first UE of the at least one UE according to at least one piece of response information sent by the first UE, where the first UE is any UE of the at least one UE.

The adjusting, by the adjustment module 12, the backoff window according to the first information includes at least one of the following steps:

if the first information of the first UE is equivalent NACK information, increasing a backoff window that is of the base station on the first channel and that is used to schedule the first UE, or keeping a backoff window that is of the base station on the first channel and that is used to schedule the first UE, unchanged, and skipping scheduling the first UE within first time; or if the first information of the first UE is equivalent ACK information, decreasing a backoff window that is of the base station on the first channel and that is used to schedule the first UE, or keeping a backoff window that is of the base station on the first channel and that is used to schedule the first UE, unchanged.

The obtaining, by the obtaining module 11, the first information of the first UE of the at least one UE according to the at least one piece of response information sent by the first UE includes at least one of the following steps:

obtaining a fifth value according to a ratio of a quantity of pieces of ACK information in the at least one piece of response information sent by the first UE, to a total quantity of pieces of the at least one piece of response information sent by the first UE, where if the fifth value is greater than a preset fifth threshold, the first information of the first UE is the equivalent ACK information;

obtaining a sixth value according to a ratio of a quantity of pieces of NACK information in the at least one piece of response information sent by the first UE, to a total quantity of pieces of the at least one piece of response information sent by the first UE, where if the sixth value is greater than a preset sixth threshold, the first information of the first UE is the equivalent NACK information;

obtaining a seventh value according to a quantity of pieces of ACK information in the at least one piece of response information sent by the first UE, where if the seventh value is greater than a preset seventh threshold, the first information of the first UE is the equivalent ACK information; or obtaining an eighth value according to a quantity of pieces of NACK information in the at least one piece of response information sent by the first UE, where if the eighth value is greater than a preset eighth threshold, the first information of the first UE is the equivalent NACK information.

The base station provided in this embodiment can be configured to execute the method in the third embodiment. A specific implementation manner and a technical effect are similar to those of the method in the third embodiment, and details are not described herein again.

An eighteenth embodiment of the present disclosure provides a base station. The base station provided in this embodiment has a same structure as the base station shown in FIG. 16. Referring to FIG. 16, in this embodiment, the second information is response information and precoding matrix indicator PMI information, and the receiving module 13 is configured to receive at least one piece of response information and at least one piece of PMI information that are sent by the at least one UE, where the at least one piece of response information is response information that is sent by the at least one UE and that is corresponding to at least one data packet transmitted on the first channel, each of the at least one piece of response information is ACK information or NACK information, and the at least one piece of PMI information is used to indicate at least one PMI indication direction.

The obtaining, by the obtaining module 11, the first information according to second information sent by at least one user equipment UE includes: obtaining first information in a first PMI indication direction according to at least one piece of response information in the first PMI indication direction of the at least one PMI direction indicated by the at least one piece of PMI information, where the first PMI indication direction is any PMI indication direction of the at least one PMI indication direction.

The adjusting, by the adjustment module 12, the backoff window according to the first information includes at least one of the following steps:

if the first information in the first PMI indication direction is equivalent NACK information, increasing a backoff window that is of the base station on the first channel and that is used to schedule UE in the first PMI indication direction, or keeping a backoff window that is of the base station on the first channel and that is used to schedule UE in the first PMI indication direction, unchanged, and skipping scheduling the UE in the first PMI indication direction within second time; or if the first information in the first PMI indication direction is equivalent ACK information, decreasing a backoff window that is of the base station on the first channel and that is used to schedule UE in the first PMI indication direction, or keeping a backoff window that is of the base station on the first channel and that is used to schedule UE in the first PMI indication direction, unchanged.

The obtaining, by the obtaining module 11, first information in a first PMI indication direction according to at least one piece of response information in the first PMI indication direction of the at least one PMI direction indicated by the at least one piece of PMI information includes at least one of the following steps:

obtaining a ninth value according to a ratio of a quantity of pieces of ACK information in the at least one piece of response information in the first PMI indication direction, to a total quantity of pieces of the at least one piece of response information in the first PMI indication direction, where if the ninth value is greater than a preset ninth threshold, the first information in the first PMI indication direction is the equivalent ACK information;

obtaining a tenth value according to a ratio of a quantity of pieces of NACK information in the at least one piece of response information in the first PMI indication direction, to a total quantity of pieces of the at least one piece of response information in the first PMI indication direction, where if the tenth value is greater than a preset tenth threshold, the first information in the first PMI indication direction is the equivalent NACK information;

obtaining an eleventh value according to a quantity of pieces of ACK information in the at least one piece of response information in the first PMI indication direction, where if the eleventh value is greater than a preset eleventh threshold, the first information in the first PMI indication direction is the equivalent ACK information; or obtaining a twelfth value according to a quantity of pieces of NACK information in the at least one piece of response information in the first PMI indication direction, where if the twelfth value is greater than a preset twelfth threshold, the first information in the first PMI indication direction is the equivalent NACK information.

The base station provided in this embodiment can be configured to execute the method in the fourth embodiment. A specific implementation manner and a technical effect are similar to those of the method in the fourth embodiment, and details are not described herein again.

A nineteenth embodiment of the present disclosure provides a base station. The base station provided in this embodiment has a same structure as the base station shown in FIG. 16. Referring to FIG. 16, in this embodiment, the second information is collision information, and the receiving module 13 is configured to receive at least one piece of collision information sent by the at least one UE, where the collision information is used to indicate whether the base station collides with a WI-FI system, an LAA system, or another system on the first channel.

The obtaining, by the obtaining module 11, the first information according to second information sent by at least one user equipment UE includes: obtaining the first information according to the at least one piece of collision information sent by the at least one UE.

The adjusting, by the adjustment module 12, the backoff window according to the first information includes at least one of the following steps: if the first information is equivalent collision, increasing the backoff window of the base station on the first channel; or if the first information is equivalent non-collision, decreasing the backoff window of the base station on the first channel, or keeping the backoff window of the base station on the first channel unchanged.

The obtaining, by the obtaining module 11, the first information according to the at least one piece of collision information sent by the at least one UE includes at least one of the following steps:

obtaining a thirteenth value according to a ratio of a quantity of pieces of information that is in the at least one piece of collision information and indicates no collision, to a total quantity of pieces of the at least one piece of collision information, where if the thirteenth value is greater than a preset thirteenth threshold, the first information is the equivalent non-collision;

obtaining a fourteenth value according to a ratio of a quantity of pieces of information that is in the at least one piece of collision information and indicates collision, to a total quantity of pieces of the at least one piece of collision information, where if the fourteenth value is greater than a preset fourteenth threshold, the first information is the equivalent collision;

obtaining a fifteenth value according to a quantity of pieces of information that is in the at least one piece of collision information and indicates no collision, where if the fifteenth value is greater than a preset fifteenth threshold, the first information is the equivalent non-collision; or obtaining a sixteenth value according to a quantity of pieces of information that is in the at least one piece of collision information and indicates collision, where if the sixteenth value is greater than a preset sixteenth threshold, the first information is the equivalent collision.

The base station provided in this embodiment can be configured to execute the method in the fifth embodiment. A specific implementation manner and a technical effect are similar to those of the method in the fifth embodiment, and details are not described herein again.

A twentieth embodiment of the present disclosure provides a base station. The base station provided in this embodiment has a same structure as the base station shown in FIG. 16. Referring to FIG. 16, in this embodiment, the second information is response information, and the receiving module 13 is configured to receive at least one piece of response information sent by the at least one UE, where the at least one piece of response information is response information that is sent by the at least one UE and that is corresponding to at least one data packet transmitted on the first channel, and each of the at least one piece of response information is ACK information or NACK information.

The obtaining, by the obtaining module 11, the first information according to second information sent by at least one user equipment UE includes: obtaining information about a quantity of retransmission times of an ARQ and/or an HARQ of first UE of the at least one UE according to response information sent by the first UE, where the quantity of retransmission times of the ARQ and/or the HARQ of the first UE is the first information.

The adjusting, by the adjustment module 12, the backoff window according to the first information includes at least one of the following steps: if the quantity of retransmission times of the ARQ and/or the HARQ of the first UE is greater than a preset seventeenth threshold, increasing the backoff window of the base station on the first channel; or if the quantity of retransmission times of the ARQ and/or the HARQ of the first UE is less than a preset eighteenth threshold, decreasing the backoff window of the base station on the first channel, or keeping the backoff window of the base station on the first channel unchanged.

The base station provided in this embodiment can be configured to execute the method in the sixth embodiment. A specific implementation manner and a technical effect are similar to those of the method in the sixth embodiment, and details are not described herein again.

A twenty-first embodiment of the present disclosure provides a base station. The base station provided in this embodiment has a same structure as the base station shown in FIG. 15. Referring to FIG. 15, in this embodiment, the obtaining, by the obtaining module 11, the first information according to a result of CCA on the first channel includes: performing CCA check on the first channel, to obtain information about idle time of the first channel and total CCA check time of the first channel; and obtaining a seventeenth value according to a ratio of the idle time of the first channel to the total CCA check time of the first channel, where the seventeenth value is the first information.

The adjusting, by the adjustment module 12, the backoff window according to the first information includes at least one of the following steps: if the seventeenth value is less than a preset nineteenth threshold, increasing the backoff window of the base station on the first channel; or if the seventeenth value is greater than a preset twentieth threshold, decreasing the backoff window of the base station on the first channel, or keeping the backoff window of the base station on the first channel unchanged.

The base station provided in this embodiment can be configured to execute the method in the seventh embodiment. A specific implementation manner and a technical effect are similar to those of the method in the seventh embodiment, and details are not described herein again.

A twenty-second embodiment of the present disclosure provides a base station. The base station provided in this embodiment has a same structure as the base station shown in FIG. 15. Referring to FIG. 15, in this embodiment, the obtaining, by the obtaining module 11, the first information according to a result of CCA on the first channel includes: performing CCA check on the first channel on a basis of a CCA slot, to obtain information about a quantity of idle CCA slots on the first channel, where the CCA slot is of a predefined time length, and the information about the quantity of idle CCA slots on the first channel is the first information.

The adjusting, by the adjustment module 12, the backoff window according to the first information includes at least one of the following steps: if N idle CCA slots are not detected within a time length of M CCA slots on the first channel, increasing the backoff window of the base station on the first channel; or if at least N idle CCA slots are detected within a time length of M CCA slots on the first channel, decreasing the backoff window of the base station on the first channel, or keeping the backoff window of the base station on the first channel unchanged, where the time length of the M CCA slots is a length of the backoff window of the base station on the first channel at a current moment, and N is a random number, between 0 and M, randomly generated by the base station before performing CCA check.

The base station provided in this embodiment can be configured to execute the method in the eighth embodiment. A specific implementation manner and a technical effect are similar to those of the method in the eighth embodiment, and details are not described herein again.

A twenty-third embodiment of the present disclosure provides a base station. The base station provided in this embodiment has a same structure as the base station shown in FIG. 15. Referring to FIG. 15, in this embodiment, the obtaining, by the obtaining module 11, the first information according to a result of system collision detection on the first channel includes: detecting a signal of a WI-FI system, an LAA system, or another system on the first channel, to obtain information about whether the base station collides with the WI-FI system, the LAA system, or the another system on the first channel, where the information about whether the base station collides with the WI-FI system, the LAA system, or the another system on the first channel is the first information.

The adjusting, by the adjustment module 12, the backoff window according to the first information includes at least one of the following steps: if the first information indicates system collision, increasing the backoff window of the base station on the first channel; or if the first information indicates no system collision, decreasing the backoff window of the base station on the first channel, or keeping the backoff window of the base station on the first channel unchanged.

The base station provided in this embodiment can be configured to execute the method in the ninth embodiment. A specific implementation manner and a technical effect are similar to those of the method in the ninth embodiment, and details are not described herein again.

On a basis of the fifteenth embodiment, the obtaining, by the obtaining module 11, the first information according to whether a length of the backoff window on the first channel reaches a maximum length includes: determining that the length of the backoff window of the base station on the first channel reaches the maximum length; and the adjusting, by the adjustment module 12, the backoff window according to the first information includes: if the length of the backoff window of the base station on the first channel reaches the maximum length and this case maintains P times, decreasing the backoff window of the base station on the first channel, where P is an integer that is not less than 0.

Figure 17:
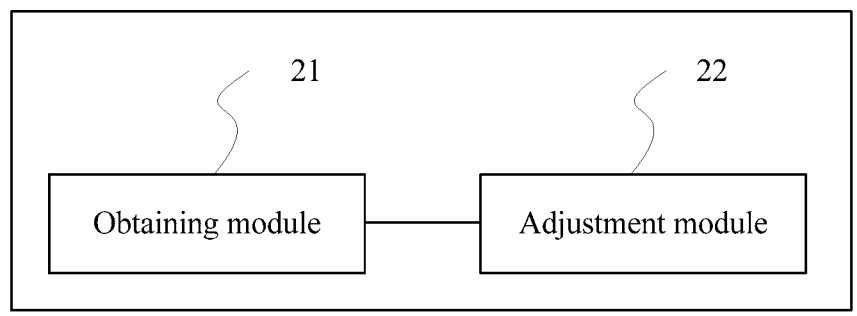
FIG. 17 is a schematic structural diagram of UE according to a twenty-fourth embodiment of the present disclosure.

FIG. 17 is a schematic structural diagram of UE according to a twenty-fourth embodiment of the present disclosure. As shown in FIG. 17, the UE provided in this embodiment includes an obtaining module 21 and an adjustment module 22.

The obtaining module 21 is configured to obtain first information that is used to instruct to adjust a backoff window on a first channel. The obtaining, by the obtaining module, the first information includes at least one of the following steps:

obtaining the first information according to second information sent by a base station;

obtaining the first information according to a result of clear channel assessment CCA on the first channel;

obtaining the first information according to a result of system collision detection on the first channel; or obtaining the first information according to whether a length of the backoff window on the first channel reaches a maximum length.

The adjustment module 22 is configured to adjust the backoff window of the UE on the first channel according to the first information.

The UE provided in this embodiment can be configured to execute the method in the tenth embodiment. A specific implementation manner and a technical effect are similar to those of the method in the tenth embodiment, and details are not described herein again.

Figure 18:
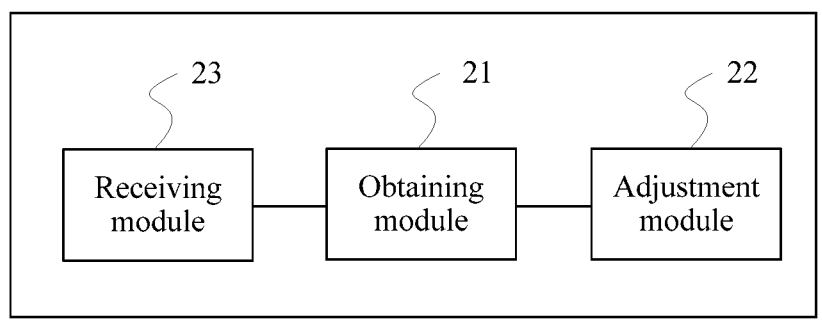
FIG. 18 is a schematic structural diagram of UE according to a twenty-fifth embodiment of the present disclosure.

FIG. 18 is a schematic structural diagram of UE according to a twenty-fifth embodiment of the present disclosure. In this embodiment, the second information is response information. As shown in FIG. 18, on a basis of a structure of the UE shown in FIG. 17, the UE provided in this embodiment further includes a receiving module 23.

The receiving module 23 is configured to receive at least one piece of response information sent by the base station, where the at least one piece of response information is response information that is of the base station and that is corresponding to at least one data packet transmitted on the first channel, and each of the at least one piece of response information is positive acknowledgment ACK information or negative acknowledgment NACK information.

The obtaining, by the obtaining module 21, the first information according to second information sent by a base station includes: obtaining the first information according to the at least one piece of response information.

The adjusting, by the adjustment module 22, the backoff window of the UE on the first channel according to the first information includes at least one of the following steps: if the first information includes at least one piece of NACK information, increasing the backoff window of the UE on the first channel; or if the first information includes at least one piece of ACK information, decreasing the backoff window of the UE on the first channel, or keeping the backoff window of the UE on the first channel unchanged.

The UE provided in this embodiment can be configured to execute the method in the eleventh embodiment. A specific implementation manner and a technical effect are similar to those of the method in the eleventh embodiment, and details are not described herein again.

A twenty-sixth embodiment of the present disclosure provides UE. The UE provided in this embodiment has a same structure as the UE shown in FIG. 17. Referring to FIG. 17, in this embodiment, the obtaining, by the obtaining module 21, the first information according to a result of CCA on the first channel includes: performing CCA check on the first channel, to obtain information about idle time of the first channel and total CCA check time of the first channel; and obtaining an eighteenth value according to a ratio of the idle time of the first channel to the total CCA check time of the first channel, where the eighteenth value is the first information.

The adjusting, by the adjustment module 22, the backoff window of the UE on the first channel according to the first information includes at least one of the following steps: if the eighteenth value is less than a preset twenty-first threshold, increasing the backoff window of the UE on the first channel; or if the eighteenth value is greater than a preset twenty-second threshold, decreasing the backoff window of the UE on the first channel, or keeping the backoff window of the UE on the first channel unchanged.

The UE provided in this embodiment can be configured to execute the method in the twelfth embodiment. A specific implementation manner and a technical effect are similar to those of the method in the twelfth embodiment, and details are not described herein again.

A twenty-seventh embodiment of the present disclosure provides UE. The UE provided in this embodiment has a same structure as the UE shown in FIG. 17. Referring to FIG. 17, in this embodiment, the obtaining, by the obtaining module 21, the first information according to a result of CCA on the first channel includes: performing CCA check on the first channel on a basis of a CCA slot, to obtain information about a quantity of idle CCA slots on the first channel, where the CCA slot is of a predefined time length, and the information about the quantity of idle CCA slots on the first channel is the first information.

The adjusting, by the adjustment module 22, the backoff window of the UE on the first channel according to the first information includes at least one of the following steps: if the UE does not detect N idle CCA slots within a time length of M CCA slots on the first channel, increasing the backoff window of the UE on the first channel; or if the UE detects N idle CCA slots within a time length of M CCA slots on the first channel, decreasing the backoff window of the UE on the first channel, or keeping the backoff window of the UE on the first channel unchanged, where the time length of the M CCA slots is a current length of the backoff window of the UE on the first channel, and N is a random number, between 0 and M, randomly generated by the UE before performing CCA check.

The UE provided in this embodiment can be configured to execute the method in the thirteenth embodiment. A specific implementation manner and a technical effect are similar to those of the method in the thirteenth embodiment, and details are not described herein again.

A twenty-eighth embodiment of the present disclosure provides UE. The UE provided in this embodiment has a same structure as the UE shown in FIG. 17. Referring to FIG. 17, in this embodiment, the obtaining, by the obtaining module 21, the first information according to a result of system collision detection on the first channel includes: detecting a signal of a WI-FI system, an LAA system, or another system on the first channel, to obtain information about whether the UE collides with the WI-FI system, the LAA system, or the another system on the first channel, where the information about whether the UE collides with the WI-FI system, the LAA system, or the another system on the first channel is the first information.

The adjusting, by the adjustment module 22, the backoff window of the UE on the first channel according to the first information includes at least one of the following steps: if the first information indicates system collision, increasing the backoff window of the UE on the first channel; or if the first information indicates no system collision, decreasing the backoff window of the UE on the first channel, or keeping the backoff window of the UE on the first channel unchanged.

The UE provided in this embodiment can be configured to execute the method in the fourteenth embodiment. A specific implementation manner and a technical effect are similar to those of the method in the fourteenth embodiment, and details are not described herein again.

On a basis of the twenty-fourth embodiment, the obtaining, by the obtaining module 21, the first information according to whether a length of the backoff window on the first channel reaches a maximum length includes: determining that the length of the backoff window of the UE on the first channel reaches the maximum length. The adjusting, by the adjustment module 22, the backoff window according to the first information includes: if the length of the backoff window of the UE on the first channel reaches the maximum length and this case maintains P times, decreasing the backoff window of the UE on the first channel, where P is an integer that is not less than 0.

Figure 19:
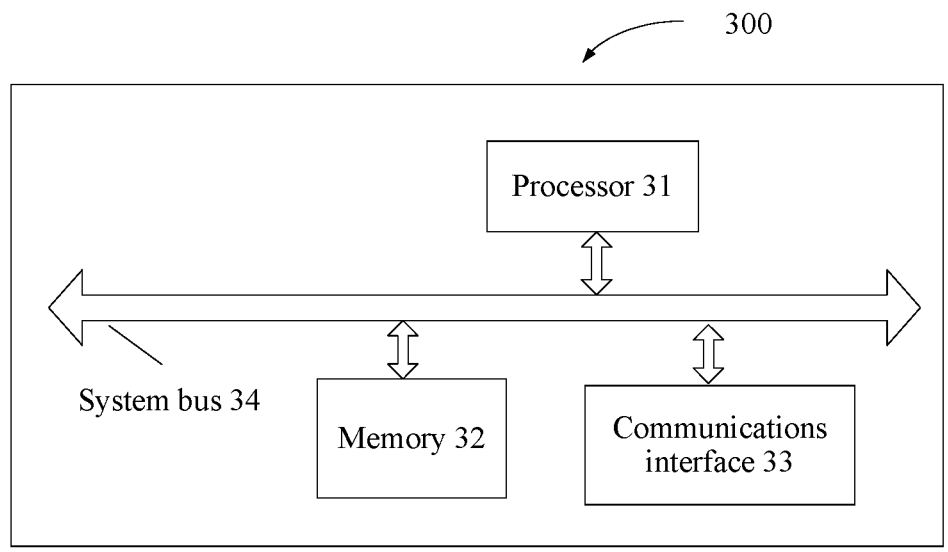
FIG. 19 is a schematic structural diagram of a base station according to a twenty-ninth embodiment of the present disclosure.

FIG. 19 is a schematic structural diagram of a base station according to a twenty-ninth embodiment of the present disclosure. As shown in FIG. 19, the base station 300 provided in this embodiment includes a processor 31, a memory 32, a communications interface 33, and a system bus 34. The memory 32, the communications interface 33, and the processor 31 are connected and communicate with each other by using the system bus 34. The memory 32 is configured to store a computer execution instruction. The communications interface 33 is configured to communicate with another device. The processor 31 is configured to run the computer execution instruction, to execute the methods in the first embodiment to the ninth embodiment. A specific implementation manner and a technical effect are similar to those of the methods in the first embodiment to the ninth embodiment, and details are not described herein again.

Figure 20:
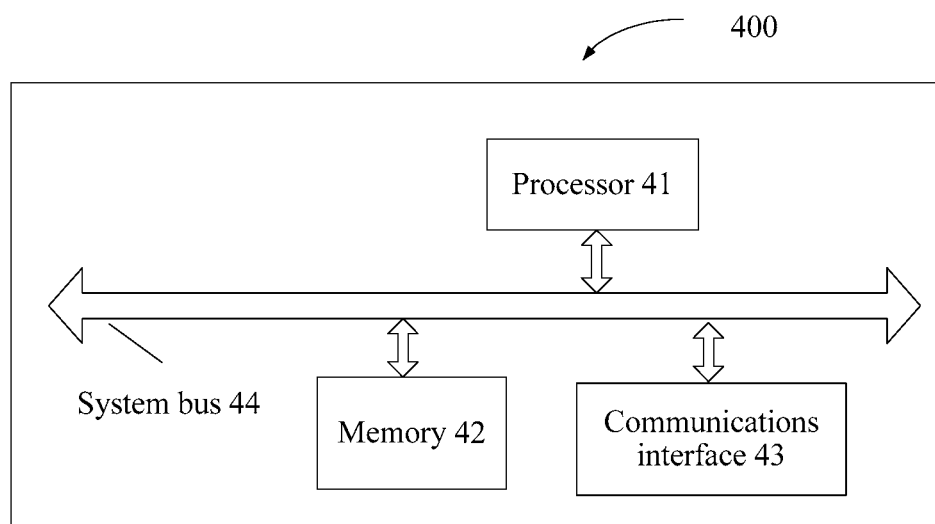
FIG. 20 is a schematic structural diagram of UE according to a thirtieth embodiment of the present disclosure.

FIG. 20 is a schematic structural diagram of UE according to a thirtieth embodiment of the present disclosure. As shown in FIG. 20, the UE 400 provided in this embodiment includes a processor 41, a memory 42, a communications interface 43, and a system bus 44. The memory 42, the communications interface 43, and the processor 41 are connected and communicate with each other by using the system bus 44. The memory 42 is configured to store a computer execution instruction. The communications interface 43 is configured to communicate with another device. The processor 41 is configured to run the computer execution instruction, to execute the methods in the tenth embodiment to the fourteenth embodiment. A specific implementation manner and a technical effect are similar to those of the methods in the tenth embodiment to the fourteenth embodiment, and details are not described herein again.

A person of ordinary skill in the art may understand that all or some of the steps of the method embodiments may be implemented by a program instructing relevant hardware. The foregoing program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are only intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A backoff window adjustment method, comprising:
receiving, by a base station, at least one piece of response information from at least one user equipment (UE), wherein the at least one piece of response information corresponds to at least one data packet transmitted on a first channel, and the at least one piece of response information comprises a positive acknowledgment (ACK) information or a negative acknowledgment (NACK) information;
obtaining, by the base station, a first information according to a second information, wherein the second information comprises the at least one piece of response information, and the first information is used to instruct to adjust a backoff window on the first channel; and
adjusting, by the base station, the backoff window according to the first information, wherein adjusting the backoff window comprises:
in response to determining that the first information comprises equivalent NACK information, increasing the backoff window of the base station on the first channel; or in response to determining that the first information comprises equivalent ACK information, decreasing the backoff window of the base station on the first channel.

2. The method according to claim 1, wherein the obtaining, by the base station, the first information according to the second information, comprises at least one of the following steps:
obtaining, by the base station, a first value according to a ratio of a quantity of pieces of ACK information in the at least one piece of response information, to a total quantity of pieces of the at least one piece of response information, wherein in response to determining that the first value is greater than a preset first threshold, the first information comprises the equivalent ACK information; or
obtaining, by the base station, a second value according to a ratio of a quantity of pieces of NACK information in the at least one piece of response information, to a total quantity of pieces of the at least one piece of response information, wherein in response to determining that the second value is greater than a preset second threshold, the first information comprises the equivalent NACK information.

3. A backoff window adjustment method, comprising:
receiving, by a user equipment (UE), at least one piece of response information from a base station, wherein the at least one piece of response information is response information of the base station, and the at least one piece of response information corresponds to at least one data packet transmitted on a first channel, wherein the at least one piece of response information comprises a positive acknowledgment (ACK) information or a negative acknowledgment (NACK) information;
obtaining, by the UE, a first information according to a second information, wherein the second information comprises the at least one piece of response information, and the first information is used to instruct to adjust a backoff window on the first channel; and
adjusting, by the UE, the backoff window of the UE on the first channel according to the first information, wherein adjusting the backoff window comprises:
in response to determining that the first information comprises equivalent NACK information, increasing the backoff window of the UE on the first channel; or
in response to determining that the first information comprises equivalent ACK information, decreasing the backoff window of the UE on the first channel.

4. A base station, comprising:
a processor,
a memory storing instructions,
a communications interface configured to communicate with another device, and
a system bus, wherein the memory, the communications interface, and the processor are connected and communicate with each other by using the system bus;
wherein the processor is configured to run the instructions, to execute a backoff window adjustment method, comprising:
receiving, by the base station, at least one piece of response information from at least one user equipment (UE), wherein the at least one piece of response information corresponds to at least one data packet transmitted on a first channel, and the at least one piece of response information comprises a positive acknowledgment (ACK) information or a negative acknowledgment (NACK) information;
obtaining, by the base station, a first information according to a second information, wherein the second information comprises the at least one piece of response information, and the first information is used to instruct to adjust a backoff window on the first channel; and
adjusting, by the base station, the backoff window according to the first information, wherein adjusting the backoff window comprises:
in response to determining that the first information comprises equivalent NACK information, increasing the backoff window of the base station on the first channel; or
in response to determining that the first information comprises equivalent ACK information, decreasing the backoff window of the base station on the first channel.

5. A user equipment (UE), comprising:
a processor,
a memory storing instructions,
a communications interface configured to communicate with another device, and
a system bus, wherein the memory, the communications interface, and the processor are connected and communicate with each other by using the system bus;
wherein the processor is configured to run the instructions, to execute a backoff window adjustment method, comprising:
receiving, by the UE, at least one piece of response information from a base station, wherein the at least one piece of response information is response information of the base station, and the at least one piece of response information corresponds to at least one data packet transmitted on a first channel, wherein the at least one piece of response information comprises a positive acknowledgment (ACK) information or a negative acknowledgment (NACK) information;
obtaining, by the UE, a first information according to a second information, wherein the second information comprises the at least one piece of response information, and the first information is used to instruct to adjust a backoff window on the first channel; and
adjusting, by the UE, the backoff window of the UE on the first channel according to the first information, wherein adjusting the backoff window comprises:
in response to determining that the first information comprises equivalent NACK information, increasing the backoff window of the UE on the first channel; or
in response to determining that the first information comprises equivalent ACK information, decreasing the backoff window of the UE on the first channel.

6. The method according to claim 1, comprising:
obtaining, by the base station, the first information further according to at least one of the following information:
a result of clear channel assessment (CCA) on the first channel; or
a result of system collision detection on the first channel; or
whether a length of the backoff window on the first channel reaches a maximum length.

7. The method according to claim 1, wherein:
the second information further comprises at least one piece of precoding matrix indicator (PMI) information that is sent by the at least one UE, and the at least one piece of PMI information is adapted to indicate at least one PMI indication direction;

the obtaining, by the base station, the first information according to the second information comprises:

obtaining, by the base station, the first information in a first PMI indication direction according to at least one PMI direction indicated by the at least one piece of PMI information, wherein the first PMI indication direction is any PMI indication direction of the at least one PMI indication direction.

8. The method according to claim 1, wherein the second information further comprises at least one piece of collision information sent by the at least one UE, wherein the collision information indicates whether the base station collides with a wireless fidelity (WI-FI) system or a licensed-assisted access (LAA) system on the first channel.

9. The method according to claim 1, further comprising:
receiving, by the base station, at least one piece of response information respectively sent from a plurality of UEs.

10. The method according to claim 3, comprising:
obtaining, by the UE, the first information further according to at least one of the following information:
a result of clear channel assessment (CCA) on the first channel; or
a result of system collision detection on the first channel; or
whether a length of the backoff window on the first channel reaches a maximum length.

11. The method according to claim 3, further comprising:
detecting, by the UE, a signal of a wireless fidelity (WI-FI) system or a licensed-assisted access (LAA) system on the first channel, to obtain information about whether the UE collides with the WI-FI system or the LAA system on the first channel.

* * * * *